United States Patent
Foti et al.

(10) Patent No.: US 11,889,298 B2
(45) Date of Patent: Jan. 30, 2024

(54) SECURITY GATEWAY SELECTION IN HYBRID 4G AND 5G NETWORKS

(71) Applicants: George Foti, Dollard des Ormeaux (CA); Lila Madour, Kirkland (CA)

(72) Inventors: George Foti, Dollard des Ormeaux (CA); Lila Madour, Kirkland (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 16/765,634

(22) PCT Filed: Nov. 20, 2018

(86) PCT No.: PCT/IB2018/059142
§ 371 (c)(1),
(2) Date: May 20, 2020

(87) PCT Pub. No.: WO2019/097499
PCT Pub. Date: May 23, 2019

(65) Prior Publication Data
US 2020/0280843 A1 Sep. 3, 2020

Related U.S. Application Data

(60) Provisional application No. 62/588,604, filed on Nov. 20, 2017.

(51) Int. Cl.
*H04W 4/00* (2018.01)
*H04W 12/00* (2021.01)
(Continued)

(52) U.S. Cl.
CPC ....... *H04W 12/009* (2019.01); *H04L 61/4511* (2022.05); *H04L 63/0892* (2013.01);
(Continued)

(58) Field of Classification Search
None
See application file for complete search history.

(56) References Cited

U.S. PATENT DOCUMENTS 10,631,224 B2 * 4/2020 Buckley ................ H04W 36/36
11,463,527 B2 * 10/2022 Rommer ................ H04L 67/14
(Continued)

OTHER PUBLICATIONS

Nokia et al., 23.501: OI#19 N3IWF and ePDG selection by 5G capable UEs, SA WG2 Meeting #123, S2-176930, Oct. 23-27, 2017, Ljubljana, Slovenia.
(Continued)

*Primary Examiner* — Bob A Phunkulh
(74) *Attorney, Agent, or Firm* — Alex Nicolaescu; Ericsson Canada Inc.

(57) ABSTRACT

Method and apparatus relating to a wireless device supporting 3GPP 4G and 5G radio interfaces and also supporting non-3GPP access, i.e., WiFi, for selecting a security gateway of a first type e.g., ePDG or a security gateway of a second type, e.g., N3IWF for accessing to the core network of first type, e.g., EPC or of a second type e.g., SGC. As the access methods via ePDG and N3IWF are not the same, the wireless device has to determine based on information obtained by a function in the network and its capabilities whether to use an ePDG or an N3IWF for untrusted non-3GPP access. The wireless device may take into account in the selection whether it is connected to the Core network over 3GPP 4G or 5G radio access network. A corresponding apparatus claim is provided.

20 Claims, 9 Drawing Sheets

(51) Int. Cl.
  *H04L 9/40* (2022.01)
  *H04W 36/14* (2009.01)
  *H04W 88/16* (2009.01)
  *H04L 61/4511* (2022.01)
  *H04W 84/04* (2009.01)

(52) U.S. Cl.
  CPC ........... *H04W 36/14* (2013.01); *H04W 88/16* (2013.01); *H04W 84/042* (2013.01)

(56) References Cited

U.S. PATENT DOCUMENTS

| | | | | |
|---|---|---|---|---|
| 2017/0295529 | A1* | 10/2017 | Kang | H04W 48/00 |
| 2018/0103363 | A1* | 4/2018 | Faccin | H04W 8/005 |
| 2018/0167983 | A1* | 6/2018 | Salkintzis | H04W 8/22 |
| 2018/0288582 | A1* | 10/2018 | Buckley | H04W 48/14 |
| 2019/0037516 | A1* | 1/2019 | Kim | H04W 60/005 |
| 2019/0110238 | A1* | 4/2019 | Buckley | H04W 88/04 |
| 2019/0150223 | A1* | 5/2019 | Gundavelli | H04W 12/104 |
| | | | | 713/161 |
| 2019/0215691 | A1* | 7/2019 | Salkintzis | H04L 63/166 |
| 2019/0364420 | A1* | 11/2019 | Rommer | H04L 61/5007 |
| 2020/0178076 | A1* | 6/2020 | Ben Henda | H04W 12/06 |
| 2020/0275515 | A1* | 8/2020 | Li | H04W 76/15 |
| 2022/0400529 | A1* | 12/2022 | Panchal | H04W 76/15 |

OTHER PUBLICATIONS

Nokia et al., 23.501: OI#19 N3IWF and ePDG selection by 5G capable UEs, SA WG2 Meeting #123, S2-177712, Oct. 23-27, 2017, Ljubljana, Slovenia.

Nokia et al., OI #19 EPC-5GC interworking for N3GPP access, S2-176927, 2017.

Samsung, TS 23.501: N3IWF selection function, SA WG2 Meeting #121, S2-173096, May 15-19, 2017, Hangzhou, China.

ISR and Written opnion from corresponding application PCT/IB2018/059142.

* cited by examiner

SECURITY GATEWAY SELECTION IN HYBRID 4G AND 5G NETWORKS

RELATED APPLICATION

This application claims the benefit of provisional patent application Ser. No. 62/588,604, filed Nov. 20, 2017, the disclosure of which is hereby incorporated herein by reference in its entirety.

TECHNICAL FIELD

This disclosure relates generally to access to Third Generation Partnership Project, 3GPP, network over non-trusted access network.

BACKGROUND

FIG. 1 (Prior Art) illustrates the non-roaming architecture of a 3GPP fifth generation core network, 3GPP 5GCN, that supports 3GPP access and non-3GPP access as specified in 3GPP Technical Specification, TS 23.501, version 1.5.0. The non-3GPP access is untrusted, hence the UE accesses the 5GCN resources and services via the Non 3GPP Interworking function which acts as a security gateway between the untrusted non-3GPP access and the 5GCN. An example of an untrusted non-3GPP access is a wireless Local Area Network, WLAN that uses Wireless Fidelity, WiFi access technology. The UE connects to the N3IWF over the NWu interface used for establishing secure tunnel(s) between the UE and the N3IWF so that control-plane and user-plane exchanged between the UE and the 5GCN is transferred securely over untrusted non-3GPP access.

The functionality of N3IWF for supporting untrusted non-3GPP access is currently specified in 3GPP TS 23.501 as comprising the following functions:
- Support of IPsec tunnel establishment with the UE: The N3IWF terminates the Internet Key Exchange version 2/Internet Protocol Security, IKEv2/IPsec protocols with the UE over NWu and relays over N2 the information needed to authenticate the UE and authorize its access to the 5G Core Network.
- Termination of N2 and N3 interfaces to 5G Core Network for control—plane and user-plane respectively.
- Relaying uplink and downlink control-plane NAS (N1) signalling between the UE and AMF. The NAS messages are encapsulated by the IKE or IPSec Security Association, SA, established between the UE and the N3IWF.
- Handling of N2 signalling from SMF (relayed by AMF) related to PDU Sessions and QoS.
- Establishment of IPsec Security Association (IPsec SA) to support PDU Session traffic.
- Relaying uplink and downlink user-plane packets between the UE and UPF. This involves:
- De-capsulation/encapsulation of packets for IPSec and N3 tunnelling
- Enforcing QoS corresponding to N3 packet marking, taking into account QoS requirements associated to such marking received over N2
- N3 user-plane packet marking in the uplink.
- Local mobility anchor within untrusted non-3GPP access networks using MOBIKE.
- Supporting AMF selection.

FIG. 2 (Prior Art) illustrates the non-roaming architecture of a 3GPP fourth generation or Evolved Packet Core Network, EPC, that supports 3GPP access and non-3GPP access as specified in 3GPP TS 23.402, version 15.1.0. The non-3GPP access is untrusted, hence the UE accesses the EPC resources and services via the evolved Packet Data Gateway, ePDG, which acts as a security gateway between the untrusted non-3GPP access and the EPC. An example of an untrusted non-3GPP access is a wireless Local Area Network, WLAN that uses WiFi access technology. The UE connects to the ePDG over the SWu interface used for establishing secure tunnel(s) between the UE and the ePDG so that user-plane exchanged between the UE and the Packet Data Gateway, PGW of EPC is transferred securely over untrusted non-3GPP access.

The functionality of ePDG for supporting untrusted non-3GPP access is currently specified in 3GPP TS 23.402 as comprising the following functions:
- Functionality for transportation of a remote IP address as an IP address specific to a Packet Data Network, PDN, when S2b interface is used;
- Routing of packets from/to PGW to/from UE;
- Routing of downlink packets towards the IPsec SA associated to the PDN connection. if a single IPsec SA is used for the PDN);
- De-capsulation/Encapsulation of packets for IPSec and, if network based mobility (S2b) is used;
- Tunnel authentication and authorization (termination of IKEv2 signalling and relay via Authentication, Authorization and Accounting, AAA messages);
- When the UE and the ePDG supports the establishment of a separate IPsec SA per s2b bearer:
- Establishing, where applicable, a new IPsec SA between ePDG and UE over SWu for every new dedicated bearer if the UE supports multiple IPsec SAs per PDN connection.
- Maintaining binding between EPC bearer ID and IPsec SA, where applicable. The default bearer maps to the initial IPsec SA.

Wireless Device or User Equipment, UE, Selection of ePDG and N3IWF

Current 3GPP TS 23.501 specified a mechanism for a 5G wireless device or a 5G UE to select an N3IWF to access 5GCN based on the following:
- The UE performs N3IWF selection based on the ePDG selection mechanism as specified in the 3GPP TS 23.402 clause 4.5.4 except for the following differences:
- The Tracking/Location Area Identifier Fully Qualified Domain Name, FQDN, shall be constructed by the UE based only on the Tracking Area, TA, wherein the UE is located. The Location Area is not applicable on the 3GPP access.
- The ePDG FQDN format is substituted by with N3IWF FQDN format as specified in the TS 23.003.
- The ePDG identifier configuration and the ePDG selection information are substituted by the N3IWF identifier configuration and the N3IWF selection information respectively.

Similarly, a UE connecting to an EPC network over an untrusted non-3GPP access network, performs selection of an ePDG with which it will establish an IPSec tunnel. The ePDG selection is specified in 3GPP TS 23.402 and is based on the following:
- The UE performs ePDG selection based on a set of information configured by the Home Public Land Mobile, HPLMN, in the UE, and based on the UE's knowledge of the PLMN it is attached to.

When the UE attempts to construct an FQDN for selecting an ePDG in a certain PLMN-x (either a Visited PLMN or the HPLMN), then the UE shall construct one of the following FQDN formats:

Operator Identifier FQDN: The UE constructs the FQDN by using the PLMN-x ID as the Operator Identifier.

Tracking/Location Area Identity FQDN: The UE constructs the FQDN by using the identity of the Tracking Area/Location Area, TAI/LAI, it is located in (i.e. based on PLMN-x ID and Tracking Area code/Location Area Code, TAC/LAC). The Tracking/Location Area Identity FQDN is used to support location-specific ePDG selection within a PLMN.

The UE selects one of the above FQDN formats as follows:
 a) If the UE attempts to select an ePDG in the registered PLMN and the UE is configured to use for this PLMN the Tracking/Location Area Identity FQDN as defined above; and
 b) the UE knows the TAI/LAI of the area the UE it is located in (e.g. the TAI/LAI from the most recent Attach or TAU/LAU), then the UE constructs a Tracking/Location Area Identity FQDN. Otherwise the UE constructs the Operator Identifier FQDN. Also, the UE constructs the Operator Identifier FQDN as a fallback in the case of failure of DNS resolution of a Tracking/Location Area Identity based FQDN.

UE Configuration By HPLMN

The UE may be configured by the HPLMN with the following configuration:
 1) ePDG identifier configuration: It contains the FQDN or IP address of an ePDG in the HPLMN.
 2) ePDG selection information: It contains a prioritized list of PLMNs which are preferred for ePDG selection. It also indicates if selection of an ePDG in a PLMN should be based on Tracking/Location Area Identity FQDN or on Operator Identifier FQDN. The list of PLMNs may include the HPLMN.

The PLMNs included in the ePDG selection information are PLMNs that have roaming agreements with HPLMN for interworking with untrusted WLANs.

The ePDG selection information may include an "any PLMN" entry, which matches any PLMN the UE is attached to except the HPLMN. If the ePDG selection information contains both the "any PLMN" and the PLMN the UE is attached to, the UE shall give precedence to the latter.

UE ePDG Selection Procedure

The UE shall perform ePDG selection by executing the steps below. Unless otherwise specified, when the UE attempts to select an ePDG, the UE shall construct an FQDN for this ePDG and shall use the Domain Name Server, DNS, server function to obtain the IP address(es) of this ePDG:
 1) The UE shall attempt to determine the country it is located in. This is determined by implementation-specific methods not defined in this specification. If the UE cannot determine the country it is located in, the UE shall stop the ePDG selection.
 2) If the UE determines to be located in its home country, then:
  a) The UE shall select an ePDG in the HPLMN. If the ePDG selection information contains the HPLMN, the UE shall construct an FQDN. If the ePDG selection information does not contain the HPLMN and the UE is configured with the ePDG identifier, then the UE shall either use the configured FQDN and use the DNS server function to obtain the IP address(es) of the ePDG(s) in the HPLMN, or the UE shall use the configured IP address. Otherwise, the UE shall construct an Operator Identifier FQDN and shall use the DNS server function to obtain the IP address(es) of the ePDG(s) in the HPLMN.
  b) If the UE cannot select an ePDG in the HPLMN, then the UE shall stop the ePDG selection.
 3) If the UE determines to be located in a country other than its home country (called the visited country), then:
  a) If the UE is registered via 3GPP access to a PLMN and this PLMN matches an entry in the ePDG selection information, then the UE shall select an ePDG in this PLMN. If the UE fails to connect to an ePDG in this PLMN, the UE shall select an ePDG by performing the DNS procedure.
  b) In all other cases, (e.g. when the UE is not configured with the ePDG selection information, or the UE is registered via 3GPP access to a PLMN but this PLMN does not match an entry in the ePDG selection information, or the UE is not registered via 3GPP access to any PLMN), the UE shall select an ePDG by performing the DNS procedure.

ePDG Selection With DNS-Based Discovery of Regulatory Requirements

The UE shall perform ePDG selection according to the following procedure when the UE determines to be located in a country other than its home country (called the visited country) and when the conditions defined in 5GPP TS 23.402 clause 4.5.4.4 apply.

The UE shall perform a DNS query using Visited Country FQDN, to determine if the visited country mandates the selection of ePDG in this country as specified below.
 1) If the DNS response contains no records, then the UE determines that the visited country does not mandate the selection of ePDG in this country. In this case:
  a) If the ePDG selection information contains one or more PLMNs in the visited country, the UE shall select an ePDG in one of these PLMNs. The UE shall consider these PLMNs based on their priorities in the ePDG selection information. If the UE fails to connect to an ePDG in one or more of these PLMNs, the UE shall select an ePDG in the HPLMN according to bullet 1b below.
  b) Otherwise, including the case when the UE fails to connect to an ePDG according to bullet 1a above, the UE shall select an ePDG in the HPLMN. If the UE is configured with the ePDG identifier, then the UE shall either use the configured FQDN and use the DNS server function to obtain the IP address(es) of the ePDG(s) in the HPLMN, or the UE shall use the configured IP address. Otherwise, the UE shall construct an Operator Identifier FQDN and shall use the DNS server function to obtain the IP address(es) of the ePDG(s) in the HPLMN.
 2) If the DNS response contains one or more records, then the UE determines that the visited country mandates the selection of ePDG in this country. Each record in the DNS response shall contain the identity of a PLMN in the visited country which may be used for ePDG selection. In this case:
  a) If the UE is registered via 3GPP access to a PLMN which is included in the DNS response, then the UE shall select an ePDG in this PLMN. If the UE fails to connect to an ePDG in this PLMN, then the UE shall select an ePDG in one of the other PLMNs included in the DNS response.

b) If the UE is registered via 3GPP access to a PLMN which is not included in the DNS response or the UE is not registered via 3GPP access to any PLMN or the UE fails to connect to an ePDG according to bullet 2a above, then the UE shall select an ePDG in one of the PLMNs included in the DNS response as follows:

The UE shall select one of the PLMNs included in the DNS response based on the prioritized list of PLMNs in the ePDG selection information (i.e. the UE shall select first the highest priority PLMN in the ePDG selection information that is contained in the DNS response). If the ePDG selection information does not contain any of the PLMNs in the DNS response or the UE is not configured with the ePDG selection information, or the UE was not able to connect to an ePDG in the PLMNs included in the ePDG selection information and in the DNS response, then the UE shall select a PLMN included in the DNS response based on its own implementation means.

c) If the UE cannot select an ePDG in any of the PLMNs included in the DNS response, then the UE shall stop the ePDG selection.

3) If the UE does not receive a DNS response, then the UE shall stop the ePDG selection.

After the UE selects a PLMN for ePDG selection as specified above, UE shall construct an Operator Identifier FQDN for the selected PLMN and shall use the DNS server function to obtain the IP address(es) of the ePDG(s) in this PLMN.

SUMMARY

The present disclosure describes methods and apparatus for enabling a wireless device or UE that supports 3GPP 4G and 5G radio as well as WiFi, to perform selection of either an ePDG for access to EPC or an N3IWF for access to 5GCN over an untrusted non-3GPP access such as Wireless LAN, WLAN network using WiFi radio. The ePDG and N3IWF acting as security gateways to EPC and 5GCN respectively.

According to one aspect, a method performed at a wireless device or UE for selecting a security gateway for access over a non-3GPP access network is provided, wherein the method comprises the step of obtaining information from the network related to selection of a security gateway of a first type or a security gateway of a second type and selecting one of the security gateway of the first type (e.g., ePDG) or the security gateway of the second type (e.g., N3IWF) for establishing a connection over the non-3GPP access network in accordance with the obtained information, wherein the security gateway of the first type provides access for the wireless device to a first type of core network (e.g., EPC) and the security gateway of the second type provides access for the wireless device to a second type of core network (e.g., 5GCN).

In accordance with another aspect, the method further comprises the UE selecting one of the security gateways of the first type or the security gateway of the second type based on determining that a connection over a 3GPP radio access network to the first type of core network or the second type of core network exists.

In accordance with yet another aspect, the obtained information comprises a priority list for one or more public land mobile networks, PLMNs, that provide at least one the security gateway of the first type and the security gateway of the second type.

According to an aspect, the method comprises selecting a first PLMN that provides the security gateway wherein the first PLMN is the same PLMN selected for access over the 3GPP radio access network.

Alternatively, the method further comprises selecting the security gateway of the first type for access to the first type of core network while the wireless device is connected to the second type of core network over the 3GPP radio access network, wherein the first type of core network and the second type of core network are in the first PLMN.

According to another aspect, the step of selecting further comprises selecting in a second PLMN the security gateway of the first type for access to the first type of core network while connected to the second type of core network in a first PLMN over the 3GPP radio access network.

According to another aspect, the method further comprises moving existing connection over the 3GPP radio access network from the second type of core network to the first type of core network, i.e., the UE can handover the 3GPP connection from one 3GPP radio to another so both the untrusted access and the 3GPP radio access terminate in the same core network.

According to one aspect, the information obtained by the UE comprises instruction for moving the existing connection over the 3GPP radio access network from the second type of core network to the first type of core network (i.e., the handover). Further, the information may further comprise for one or more PLMNs, an identifier of the security gateway of the first type or the identifier of the security gateway of the second type associated to a network slice or a data network name, DNN or a service type.

According to one aspect, the UE may obtain the information over the 3GPP radio access network using Non-Access Stratum NAS protocol layer (i.e., 4G NAS or 5G NAS). Alternatively, the information may be obtained during local authentication in the non-3GPP access network, such as the local AAA server or it may also be obtained via DNS queries.

According to another aspect, the UE selects the security gateway based on at least one of capability of the wireless device to connect to the first type of core network and the second type of core network, and a preference of the wireless device. This is because the UE includes NAS messages when connecting to the network via the N3IWF, while it doesn't, when connecting to network via the ePDG. The selection of the security gateway may also be based on a preference of the (preferred) PLMN.

According to one aspect, a computer program comprising instructions which, when executed on at least one processor, cause the at least one processor to carry out the method according to any one of the embodiments herein.

According to another aspect a wireless device is adapted to operate according to any of the embodiments herein or the wireless device has at least one transceiver; and circuitry operable to perform the embodiments herein. Alternatively, the wireless device (or UE) comprises one or more modules configured to operate according to any of the embodiments herein.

In accordance with one aspect, a method in a network entity for enabling a wireless device to select a security gateway for connecting to a core network over a non-3GPP access network is provided, wherein the method comprises obtaining an indication, which may be one of a requested network slice or a data network name, to provide information related to enabling a wireless device selection of a security gateway of a first type or a security gateway of a second type and sending the information to the wireless device, wherein the information comprises prioritized list of one or more PLMN and corresponding identifier of at least one of the security gateway of the first type and the security gateway of the second type. According to one aspect, the network entity may be an AMF or an ANDSF or the likes that can communicate information with the UE and it be implemented in a network node or may be implemented as a virtualized network function.

BRIEF DESCRIPTION OF THE DRAWINGS

The accompanying drawing figures incorporated in and forming a part of this specification illustrate several aspects of the disclosure, and together with the description serves to explain the principles of the disclosure.

DETAILED DESCRIPTION

Figure 1:
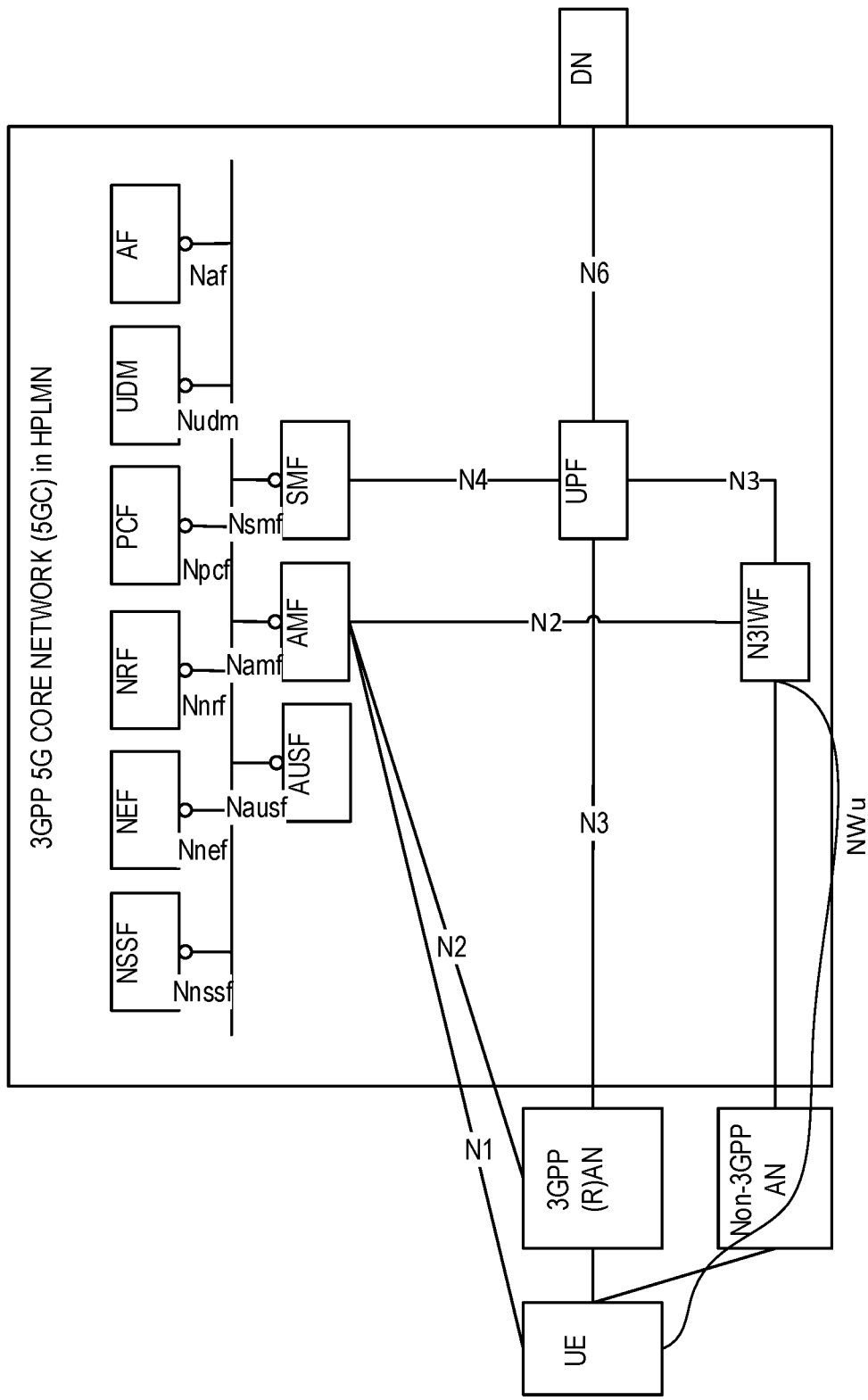
FIG. 1 (prior art) illustrates one example of a 5GCN architecture for non 3GPP access as specified in 3GPP TS 23.501 where the 5GCN or 5GC is in the Home Public Land Mobile Network, HPLMN.
Figure 2:
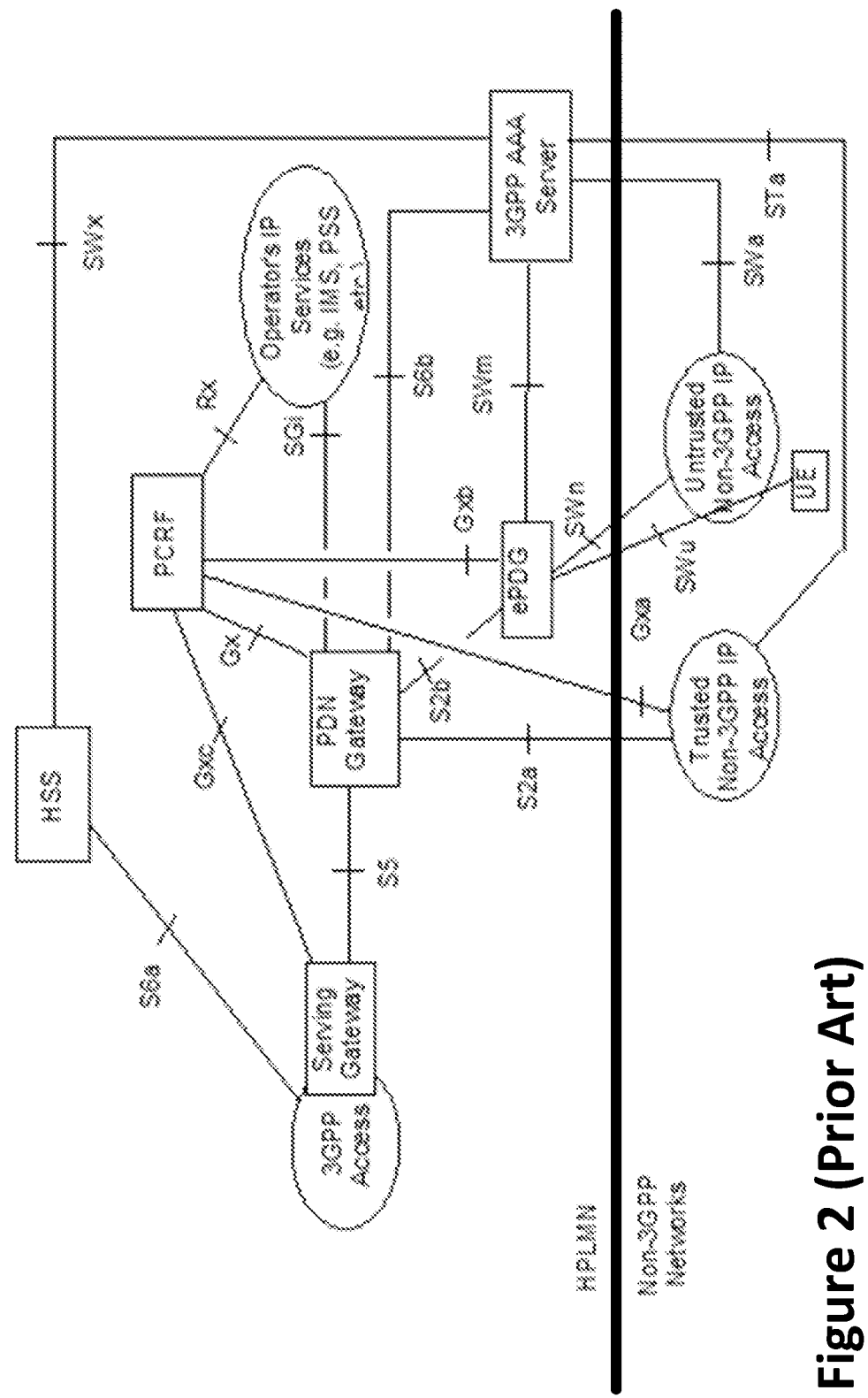
FIG. 2 (prior art) illustrates one example of an EPC architecture for non 3GPP access as specified in 3GPP TS 23.402.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, "wireless device" (WD) 40 refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user"

in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication and may in this case be referred to as a D2D communication device.

As yet another specific example, in an Internet of Things (IOT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A WD 40 as described above may represent the endpoint of a wireless connection, in which case the device may be referred to as a wireless terminal. Furthermore, a wireless device as described above may be mobile, in which case it may also be referred to as a mobile device or a mobile terminal. A User Equipment, UE, is used, as a WD when describing the embodiments in this disclosure.

Figure 3:
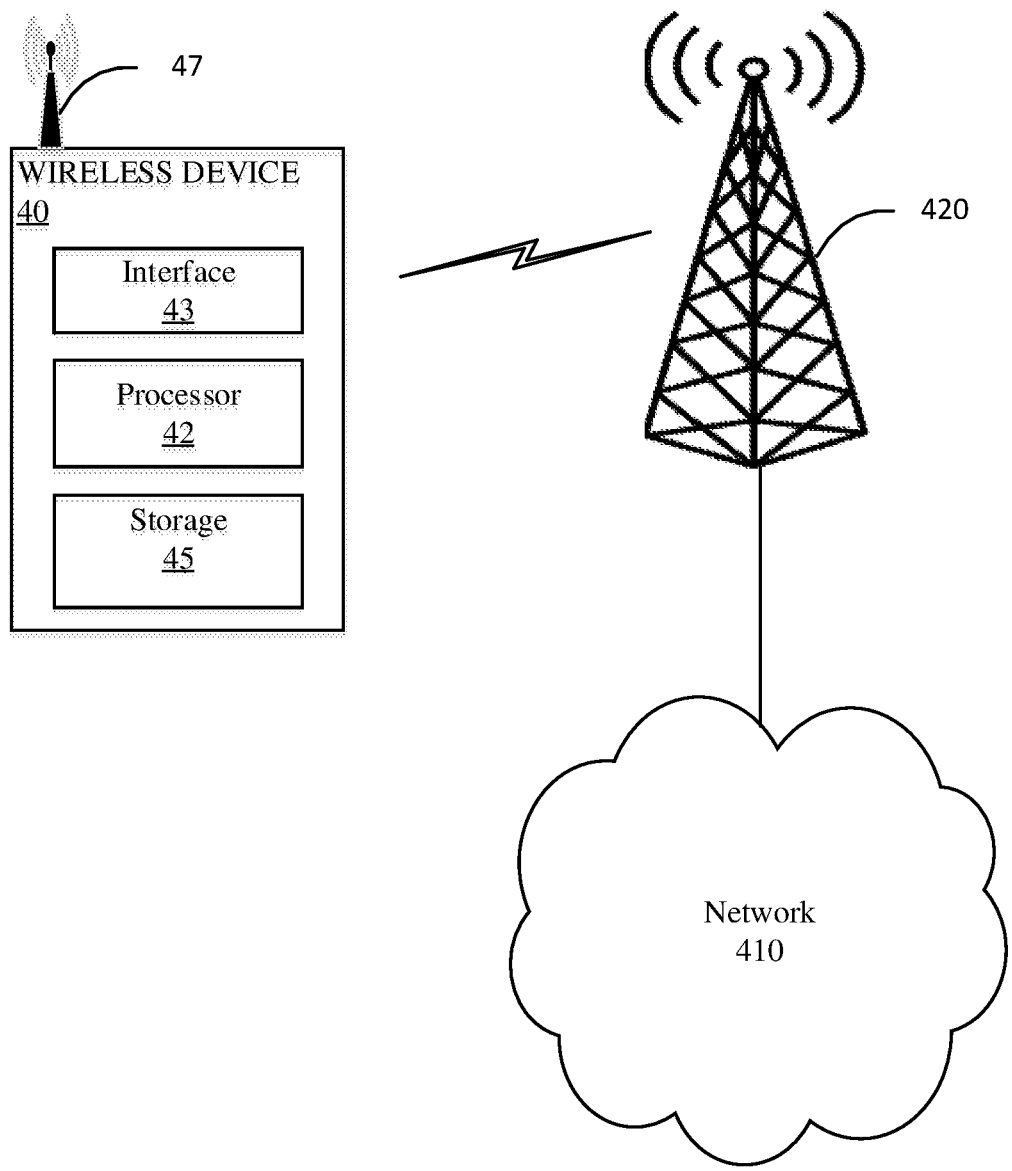
FIG. 3 illustrates an example of a wireless network including a wireless device.

As depicted in FIG. 3, WD 40 may be any type of wireless endpoint, mobile station, mobile phone, wireless local loop phone, smartphone, user equipment, desktop computer, PDA, cell phone, tablet, laptop, VoIP phone or handset, vehicle, or other device which is able to wirelessly send and receive data and/or signals to and from a network node, such as network node 440 and/or other WDs. WD 40 comprises processor 42, storage 45, interface 43, and antenna 47. The components of WD 40 are depicted as single boxes located within a single larger box, however in practice a wireless device may comprises multiple different physical components that make up a single illustrated component (e.g., storage 45 may comprise multiple discrete microchips, each microchip representing a portion of the total storage capacity).

Processor 42 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 40 components, such as storage 45, WD 40 functionality. Such functionality may include providing various wireless features discussed herein, including any of the features or benefits disclosed herein.

Storage 45 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 45 may store any suitable data, instructions, or information, including software and encoded logic, utilized by WD 40. Storage 45 may be used to store any calculations made by processor 42 and/or any data received via interface 43.

Storage 45 may comprise computer readable means on which a computer program can be stored. The computer program may include instructions which cause processor 42 (and any operatively coupled entities and devices, such as interface 43 and storage 45) to execute methods according to embodiments described herein. The computer program and/or computer program product may thus provide means for performing any steps herein disclosed.

Wireless device 40 may perform steps or functions described herein in relation with some embodiments.

Antenna 47 may be any type of antenna capable of transmitting and receiving data and/or signals wirelessly. In some embodiments, antenna 47 may comprise one or more omni-directional, sector or panel antennas operable to transmit/receive radio signals between 2 GHz and 66 GHz. For simplicity, antenna 47 may be considered a part of interface 43 to the extent that a wireless signal is being used.

FIG. 3 further illustrates a wireless network that may be used for wireless communications. The wireless network may include a plurality of wireless devices 40 and a plurality of radio access nodes 420, which may be of different types such as gNB, eNB, WiFi AP, etc. connected to one or more core network nodes (not illustrated) via a network 410. Or multiple networks 410 (not shown). Example of such networks include EPC and 5GCN. When connected over WiFi AP as node 420, the network 410 provides a security gateway (ePDG or N3IWF or both if the network 410 comprises an EPC and a 5GCN. Wireless devices 40 within a coverage area may each be capable of communicating directly with radio access nodes 420, over a wireless interface. In certain embodiments, wireless devices may also be capable of communicating with each other via device-to-device (D2D) communication.

In some embodiments, an area of wireless signal coverage associated with a radio access node 420, may be referred to as a cell.

In some embodiments, a core network node in a network 410 may manage the establishment of communication sessions and various other functionalities for wireless devices. Examples of core network node may include N3IWF, ePDG, AMF, etc. Wireless devices 40 may exchange certain signals with the core network node using the non-access stratum layer, Internet Key Exchange, IKEv2 or other version. In non-access stratum signaling, signals between wireless devices 40 and the core network node may be transparently passed through the radio access network or may be transported in IKE or Internet protocol security tunnels. In certain embodiments, radio access nodes 420 may interface with one or more network nodes over an internode interface.

The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR, 5G, 4G and/or LTE and WiFi, the embodiments may be applicable to any RAT, such as UTRA, E-UTRA, narrow band internet of things (NB-IoT), Bluetooth, next generation RAT (NR, NX), 4G, 5G, LTE FDD/TDD, WCDMA/HSPA, GSM/GERAN, WLAN, CDMA2000, etc.

There currently exists certain problem(s) when a UE or a wireless device supports both 4G and 5G and is able to support access to EPC over a non-3GPP access via an ePDG or access to the 5GCN over a non-3GPP access via an N3IWF. As noted above, a UE accessing 5GCN over untrusted non-3GPP access tunnels the NAS messages and user data over the IKE and/or IPSec SA established with the N3IWF. In other words, the N3IWF is similar to a 3GPP Radio access node in the sense that it interfaces to an AMF over an N2 reference point and to a UPF over an N3 reference point and tunnelling the NAS protocol N1 between the UE and the AMF just like the 3GPP 5G RAN node. This method of access to 5GCN over non-3GPP access will be referred to henceforth as Non-3GPP 5G method.

A UE accessing EPC only tunnels user data over an IPSec SA established with the ePDG and the ePDG tunnels the user data to/from the UE and to/from the PGW in the EPC. This method of access to EPC over non-3GPP access will be referred to henceforth as Non-3GPP 4G method.

As provided in the background section above, mechanisms are only specified for a 5G UE to select an N3IWF or a 4G UE to select an ePDG. However, there are no mechanisms defined to address a 4G/5G UE supporting Non-3GPP 5G method and/or Non-3GPP 4G method that enable the 4G/5G UE to select either an ePDG or an N3IWF. Therefore, a method of selection of an ePDG or an N3IWF performed at the 4G/5G UE based on configured and/or obtained information from the network is provided. Different aspects are provided for addressing 4G/5G UE selection of an ePDG or an N3IWF for establishing a connection over a non-3GPP access while the UE is already connected to
1. 5GCN over 3GPP 4G RAN node such as an eNB, or
2. 5GCN over 3GPP 5G RAN node such as gNB, or
3. EPC over 3GPP 4G RAN node such as eNB or
4. EPC over 3GPP 5G RAN node such as gNB but using eNB as a relay node between the gNB and EPC (non-standalone mode).

The information configured or obtained by the 4G/5G UE on which the UE bases its selection of an ePDG or an N3IWF comprises:
Indication obtained by the network to use non-3GPP 4G method (i.e., access to EPC over ePDG) or non-3GPP 5G method (i.e., access to 5GCN over N3IWF) based on Network slide information such as Network slice selection assistance information, NSSAI, and/or
UE capability to support non-3GPP 4G method and/or non-3GPP 5G method, and/or
PLMN(s)/tracking area capability(ies) to support access to ePDG and/or N3IWF, and/or
PLMN priority.
additional information may be described herein.

Certain aspects of the present disclosure and their embodiments may provide solutions to these or other problems. There are, proposed herein, various embodiments which address one or more of the issues disclosed herein.

The combined procedure for an N3IWF/ePDG selection shall result in the selection of the more efficient ePDG or N3IWF depending on the operator deployment, using one or more of the information described above such as whether either one or the other (ePDG or N3IWF) or both is available, regardless of the core network (EPC and/or 5GCN) the UE is attached to or registered in, if already connected. Note that a UE may already have a dual connection to 5GCN and EPC over 3GPP 5G and 3GPP 4G (LTE) access network.

In one aspect, if the UE supports non-3GPP 5G and non-3GPP 4G method and if both N3IWF and ePDG are available in a PLMN/TA then a priority can further be used for selecting an ePDG or an N3IWF in that PLMN. The higher priority will be tried first, and if that failed the lower priority will be tried before giving up.

In one aspect, which applies to single registration within the one PLMN that supports both EPC and 5GCN, the combined N3IWF/ePDG procedure is as follows:
1. If the UE determines that it is in its HPLMN but is not attached to EPC nor registered in 5GCN, then the UE may be configured to attempt first an ePDG selection within the HPLMN. If the ePDG selection succeeds then the procedure stops. If the ePDG selection failed, then the UE attempts to do an N3IWF selection. The procedure stops.

In another aspect, which applies to a UE already attached to EPC over a 3GPP RAN node in a PLMN that supports both EPC and 5GCN (e.g., HPLMN), the combined N3IWF/ePDG procedure is as follows
2. If the UE is currently attached to EPC, and if a priority for using non-3GPP 4G method is present for the PLMN the UE is attached to indicating a high priority for EPC, then the UE shall attempt to select an ePDG. If the ePDG selection succeeds then the procedure stops. If the ePDG selection failed, and the UE has not yet attempted to do an N3IWF selection prior to that, then the UE attempts to do an N3IWF selection and may perform an "N3IWF Preselection Procedure" as described below.
3. If the UE is currently attached to EPC, and if a priority for using non-3GPP 4G method is present in the PLMN the UE is attached to and the priority indicates a lower priority for EPC, and the UE supports a non-3GPP 5G method and has not yet attempted an N3IWF selection and, then if the UE may proceed with selecting an N3IWF to connect to 5GCN and may perform the "N3IWF Preselection Procedure" below. If the "N3IWF preselection procedure" is not performed, UE will be connected to 5GCN over non-3GPP access and to EPC over 4G RAN node.
4. If the UE is currently attached to EPC, and if no priority for using non-3GPP 4G method or non-3GPP 5G method is present in the PLMN the UE is attached to then the UE may attempt to select an ePDG by default as it is already connected to EPC via a 3GPP RAN node. If the ePDG selection succeeds then the procedure stops. If the ePDG selection fails, then the UE tries to select an N3IWF and may perform the "N3IWF Preselection Procedure".

In another aspect, which applies to a UE already attached to 5GCN over a 3GPP RAN node in a PLMN that supports EPC and 5GCN (e.g., HPLMN), the combined N3IWF/ePDG procedure is as follows
1. If the UE is registered in 5GC, and if a priority for using non-3GPP 4G method or non-3GPP 5G method is present for the PLMN the UE is attached to and the priority indicates a high priority for 5GCN, then the UE shall attempt to select an N3IWF. If the N3IWF selection succeeds then the procedure stops. If the N3IWF selection failed, and the UE has not yet attempted to do an ePDG selection prior to the failed N3IWF selection, then the UE attempts to do an ePDG selection before performing a selection in a lower priority PLMN if one is available. The UE may perform the "ePDG Preselection Procedure" if an ePDG is selected.
2. If the UE is currently registered in 5GC, and if no priority for using non-3GPP 4G method or non-3GPP 5G method is present for the PLMN the UE is attached to then the UE shall attempt to select an N3IWF. If the N3IWF selection succeeds then the procedure stops. If the N3IWF selection failed, and the UE has not yet attempted to do an ePDG selection prior to the failed N3IWF selection, then the UE attempts to do an ePDG selection and may perform the "ePDG Preselection Procedure" as described below.

3. If the UE is currently registered, and if a priority is present for the PLMN the UE is attached to indicating a lower priority for 5GCN, then the UE attempts to select an ePDG. The UE may perform the "ePDG Preselection Procedure" below. Otherwise the UE attempts to select an N3IWF.

In one aspect, an N3IWF Preselection Procedure is provided as the following:

If the current 3GPP Radio the UE is camped on is connected to 5GCN, then the UE detaches from EPC and registers in 5GCN Otherwise, the UE detaches from EPC, and performs RAT reselection to NG-RAN with 5GCN if the UE is in IDLE mode or request fallback to NG-RAN with 5GCN if in CONNECTED mode (or the UE simply leaves the current radio and reselects NG-RAN if available and if the UE is in CONNECTED mode), then registers in 5GCN.

In another aspect, an ePDG Preselection Procedure is provided as the following:

If the current 3GPP radio the UE is camped on is connected to EPC, then the UE deregisters from 5GCN, and attaches to EPC. Otherwise, the UE deregisters from 5GCN, and performs cell/radio reselection to NG-RAN with 5GCN if the UE is in IDLE mode or request fallback to NG-RAN with 5GCN if in CONNECTED mode (or the UE simply leaves the current radio and reselects NG-RAN if available if and the UE is in CONNECTED mode), then attaches to EPC.

In one aspect, the UE is configured with or obtains from, the HPLMN, or, a AAA if the non-3GPP access network is a WLAN and the AAA is in the WLAN used during local authentication of the UE, or DNS, or Over NAS if the UE is connected to a 3GPP radio to either the EPC or the 5GCN, or An Access Network selection and discovery function, ANDSF, the one or more of the following information:

1. ePDG identifier configuration (if ePDG is supported in the HPLMN): comprising the FQDN or IP address of an ePDG in the HPLMN and a corresponding priority for selecting an ePDG or an N3IWF in that PLMN. ePDG may be provided for a network slice, service type or DNN.
2. N3IWF identifier configuration (if N3IWF is supported in HPLMN): comprising the FQDN or IP address of an N3IWF in the HPLMN and a corresponding priority for selecting an ePDG or an N3IWF in that PLMN. N3IWF may be provided for a network slice, service type or DNN.
3. ePDG preselection procedure enabled/disabled.
4. N3IWF preselection procedure enabled/disabled.
5. a prioritized list of PLMNs which are preferred for ePDG selection. It also indicates if selection of an ePDG in a PLMN should be based on Tracking/Location Area Identity FQDN or on Operator Identifier FQDN. The list of PLMNs may include the HPLMN.
6. a prioritized list of PLMNs which are preferred for N3IWF selection. It also indicates if selection of an N3IWF in a PLMN should be based on Tracking/Location Area Identity FQDN or on Operator Identifier FQDN. The list of PLMNs may include the HPLMN In one aspect, the ePDG and/or N3IWF selection information may include an "any PLMN" entry, which matches any PLMN the UE is attached to except the HPLMN. If the ePDG and/or N3IWF selection information contains both the "any PLMN" and the PLMN the UE is attached to, the UE will determine which security gateway to select based on if available, the priority of connecting via an ePDG or an N3IWF, the UE capability if it supports only one method or both methods of connecting via non-3GPP access, network preference for connectivity over non-3GPP access and/or PLMN priority to select a corresponding PLMN where a security gateway should be selected.

ePDG and N3IWF Selection Procedure in the UE

Figure 4:
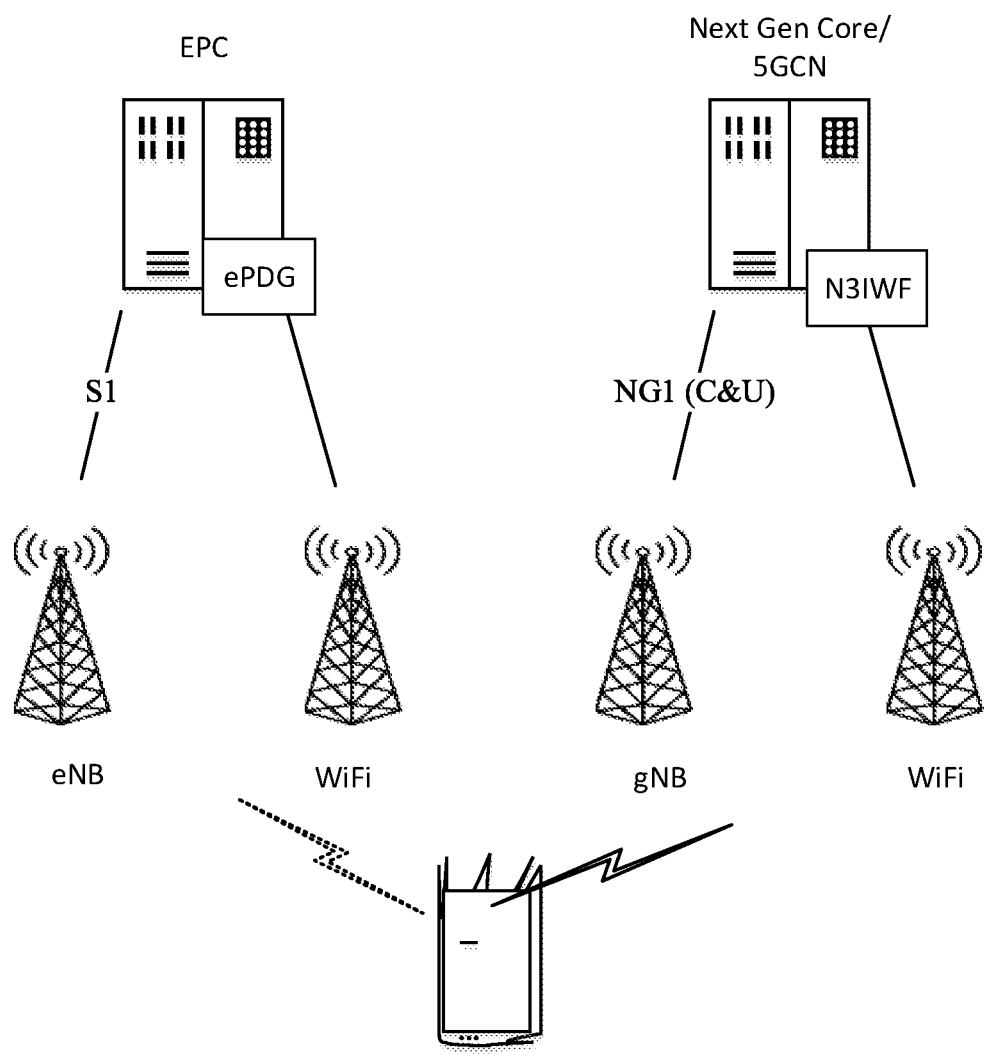
FIG. 4 illustrates a wireless network with EPC and 5GCN and the corresponding security gateways, ePDG and N3IWF in accordance with one or more embodiments.

FIG. 4 illustrates an exemplary system where a UE is able to connect to 5GCN and/or EPC simultaneously and is able to support non-3GPP 4G method and non-3GPP 5G method to access the EPC or the 5GCN when using non-3GPP access technology such as Wireless Fidelity, WiFi. The UE may select one of N3IWF or ePDG to access the respective core network over non-3GPP access. The UE may be attached to 5GCN and/or EPC over the 3GPP RAN node, i.e., gNB or eNB. The UE may connect to different core networks over different access technologies, or it may move all its connections under the same core network.

If the UE supports Non-3GPP 4G method and non-3GPP 5G method and is not attached or registered to EPC or 5GCN over a 3GPP Radio access node, the UE determines which non-3GPP access method it should use based on UE's preference, network slice identity, or as instructed by the network, or provided by DNS. In one aspect, when the HPLMN has not provided the ePDG and/or N3IWF identifier, the UE may perform one of the embodiments herein:

1. UE may perform local authentication in the non-3GPP access, e.g., WLAN. As part of the authentication, the UE is instructed to connect to a security gateway and may provide an identifier for an ePDG to connect to EPC, and/or an identifier for an N3IWF to connect to a 5GCN and may provide that information for the one or more PLMNs the WLAN has interworking agreement with. The UE may provide to the WLAN the one or more non-3GPP connectivity methods it supports, in which case the AAA may provide only the identifiers of the security gateways supporting the one or more methods. The UE then use the received FQDN of either the ePDG or the N3IWF and uses the DNS, server function to obtain the IP address(es) of the ePDG or N3IWF. The AM may also provide available security gateways per service or network slice identifier. If the UE provided to the AAA the requested service or the network slice, the AAA may return only the available security gateways (ePDG and/or N3IWF that can be used to access the requested service or the network slice for the one or more PLMN. The UE selects a security gateway based on its capability, preferences and service/network slice and based on the PLMN priority. If the UE supports both connectivity methods (non-3GPP 4G and non-3GPP 5G), the UE may select a security gateway based on the PLMN preference or based on its own preferences and based on the requested service/network slice if such information is received from the AAA>
2. UE may instead obtain the security gateway identifier from a DNS. The UE constructs an FQDN (which may be based on the country the UE is currently located or the operator id or the PLMN id.) and use it to request available security gateways from the DNS. The DNS may then return one or more records, which may be provide for each PLMN, and where each record comprise the available ePDG and N3IWF IP addresses or identifiers provided in the order of priority for the one or more PLMNs the UE is able to access. It may also provide the preferred security gateway to use for a service or network slice. If the FQDN includes the service or the network slice, the DNS may return only the available security gateways (ePDG and/or N3IWF that can be used to access the requested service or the network slice for the one or more PLMN. The UE selects a security gateway based on its capability, preferences and service/network slice and based on the PLMN priority. If the UE supports both connectivity methods (non-3GPP 4G and non-3GPP 5G), the UE may select a security gateway based on the PLMN preference or based on its own preferences and based on the requested service/network slice if such information is provided by the DNS.

3. UE may receive security gateway selection policy rules from an ANDSF server. It may also receive the rules over NAS when connected to EPC or 5GCN using 3GPP RAN access. The security gateway selection policy rules may include one or more of the following for one or more PLMNs:
   a. Supported security gateway for non-3GPP access
   b. Preferred security gateway for non 3GPP access (priority)
   c. Security gateway corresponding to a service or network slice, or Data Network Name, DNN, or Tracking area.
   d. ePDG preselection procedure enabled/disabled
   e. N3IWF preselection procedure enabled/disabled
   f. PLMN priority In one aspect, if the UE is registered via 3GPP access and determines that it wants to establish a PDU session or an additional PDU session and the UE provides a requested Network slice for the PDU session over the 3GPP access, then the Core network (5GCN or EPC) may indicate to the UE that it should connect over non-3GPP access for the requested network slice and provides either an ePDG identifier and/or an N3IWF identifier supported by the PLMN the UE is currently connected to. The UE selects one of the security gateways based on its preference to request a connection to the network slice over non-3GPP access. It will be apparent to a skilled person in the art, that the PDU session request may include the UE capability to support either or both of the non-3GPP access methods, in which case the network may determine which security gateway to provide for the UE.

In another aspect, if the UE is registered via 3GPP access on a PLMN and the UE is attempting to connect over non-3GPP access and has obtained security gateway records or information either via the AAA, ANDSF or the DNS, and the returned record for the same PLMN indicate ePDG and N3IWF as supported security gateways, then if the UE supports both methods of connecting over non-3GPP access, it could select a security gateway in the same PLMN based on its preference of the method and if available based on the supported network slices for the PLMN and security gateway. Else, the UE may select a security gateway in another PLMN if the if the PLMN does not support the In another aspect the DNS record may indicate a security gateway for service If the UE fails to connect to an ePDG in this PLMN, then the UE shall select an ePDG in one of the other PLMNs included in the DNS response.

In another embodiment, if the UE is registered via 3GPP access to a PLMN which is not included in the records obtained from DNS, AAA or ANDSF then the UE selects a security gateway in one of the PLMNs included in the response based on the following exemplary rule:

The UE first selects a PLMNs based on the prioritized list of PLMNs, verifies the security gateway record for that PLMN if it includes a security gateway that supports a connectivity method by the UE. Further if the service/network slice identifier is provided for the security gateway, the UE determines if the one or more security gateway supports the requested service/network slice. If the PLMN record indicate a security gateway that does not support the connectivity method of the UE (example the PLMN supports ePDG but the UE only supports non-3GPP 5G method), or the requested network slice is not supported, then the UE checks for another PLMN in the prioritized list.

After the UE selects a PLMN for security gateway selection, and if the record/information does not already include the IP address of the security gateway, the UE may construct an Operator Identifier FQDN for the selected PLMN which may include the network slice identifier and uses the DNS server function to obtain the IP address of the security gateway (ePDG or N3IWF) in this PLMN. If the PLMN supports both types of security gateway (ePDG and N3IWF), the UE may also specify the type of security gateway it wants to use in the FQDN.

Certain embodiments may provide one or more of the following technical advantage(s).

1. It enables a UE desiring connection to a non-3GPP access, to select an N3IWF or an ePDG based on one or more criteria including:
   a. PLMN priority
   b. Supported and preferred non-3GPP connectivity by the UE and the PLMN
   c. Network slice/service type
   d. Data Network Name, DNN
   e. Tracking area The UE may use a combination of those criteria to enable the UE to perform security gateway selection when a PLMN/TA includes both security gateways (ePDG and N3IWF) as described in the embodiments herein. Operator deployment which can include only N3IWFs in PLMN/TA, only ePDG in PLMN/TA are only supported, however, one embodiment is provided wherein the UE would only select the corresponding N3IWF or ePDG that supports the network slice/service.

Figure 5:
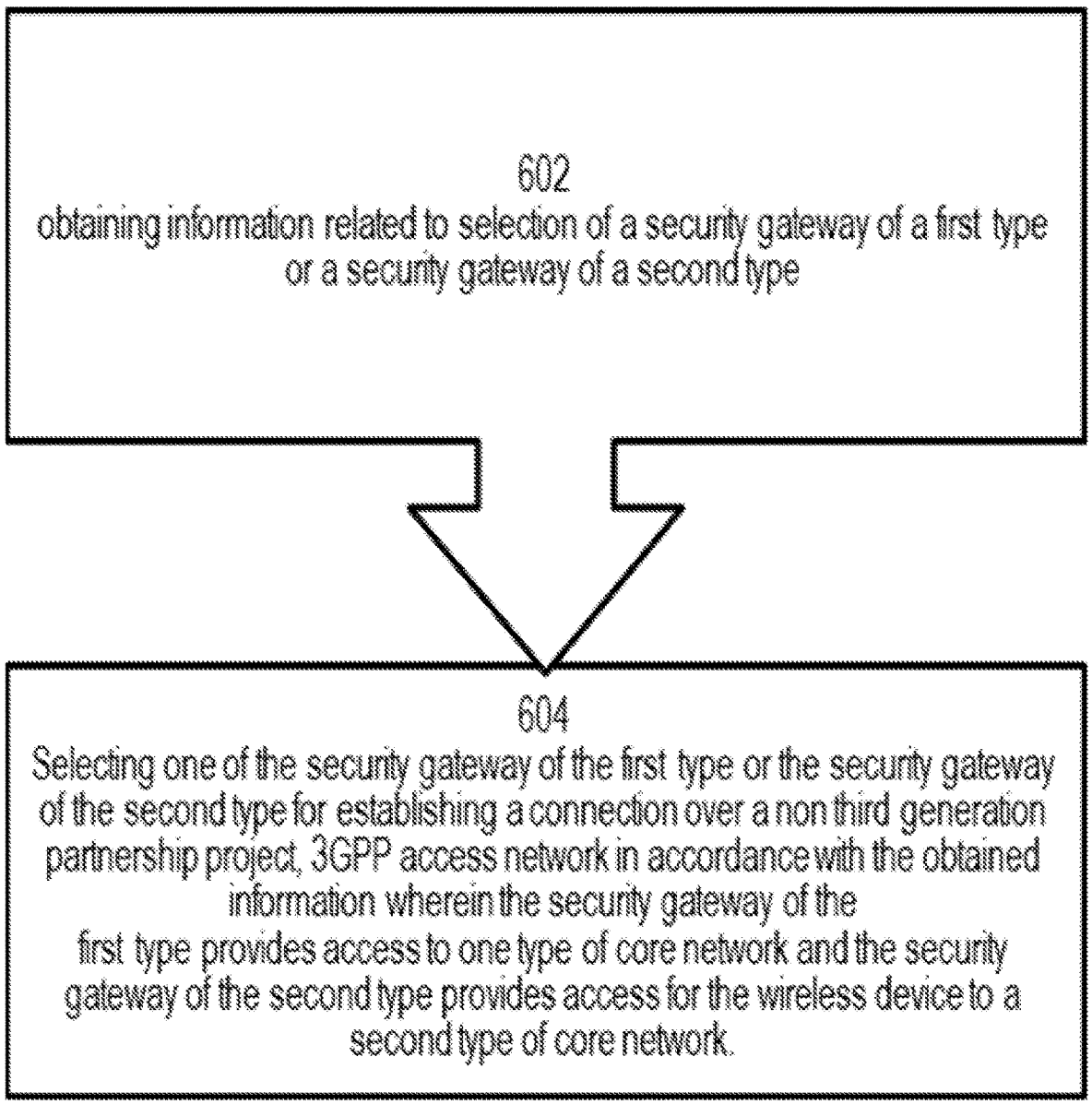
FIG. 5 illustrates a method in the wireless device for selecting a security gateway, ePDG or N3IWF according to an embodiment.

FIG. 5 depicts a method in accordance with particular embodiments, the method begins at step 602 with UE obtaining information that will enable the UE to perform the security gateway selection. That information may be obtained from the network or may be pre-configured in the UE.

When provided from the network, there are many embodiments whereby the UE may receive that information from the network. In one aspect, the UE obtains the information from,
    the HPLMN, or,
    a AAA if the non-3GPP access network is a WLAN and the AAA is in the WLAN used during local authentication of the UE, or
    DNS, or
    Over NAS if the UE is or was previously connected to a 3GPP radio to either the EPC or the 5GCN in which case the AMF in 5GCN provides the information to the UE, note that the AMF may receive that information from a different network node such as a policy control function or the likes, or An Access Network selection and discovery function, ANDSF, In one aspect, the ePDG and/or N3IWF selection information may include an "any PLMN" entry, which matches any PLMN the UE is attached to except the HPLMN. If the ePDG and/or N3IWF selection information contains both the "any PLMN" and the PLMN the UE is attached to, the UE will determine which security gateway to select based on if available, the priority of connecting via an ePDG or an N3IWF, the UE capability if it supports only one method or both methods of connecting via non-3GPP access, network preference for connectivity over non-3GPP access and/or PLMN priority to select a corresponding PLMN where a security gateway should be selected.

At step 604, the UE proceeds with the selection of the security gateway. It takes into account the received information, its capability to support connecting to EPC over non-3GPP access (non-3GPP 4G method) or to 5GCN over non-3GPP access (non-3GPP 5G method) and also whether the UE is already attached to a core network, EPC or 5GCN over a 3GPP AN node, such as LTE enB or 5G gNB. It may also take into account the security gateway that can support the requested network slice, service type or DNN if provided by the network. As explained above, the non-3GPP 4G method involves the UE establishing an IKE/IPSec connection with the ePDG and sending and receiving user data over the established IPSec SA/tunnel. Whereas the non-3GPP 5G method involves the UE establishing an IKE/IPSec connection with the ePDG and sending NAS over IKE and/or the established IPSec SA/tunnel and user data over the established IPSec tunnel. The UE in the non-3GPP 5G method continues to use NAS (as in 3GPP RAN), except NAS is encapsulated in IKE or IPSec SAs. There is no NAS signaling in non-3GPP 4G method.

If the UE supports Non-3GPP 4G method and non-3GPP 5G method and is not attached or registered to EPC or 5GCN over a 3GPP Radio access node, the UE determines which non-3GPP access method it should use based on UE's preference, network slice identity, or as instructed by the network, or provided by DNS. In one aspect, when the HPLMN has not provided the ePDG and/or N3IWF identifier, the UE may perform one of the embodiments herein:

1. UE may perform local authentication in the non-3GPP access, e.g., WLAN. As part of the authentication, the UE is instructed to connect to a security gateway and may provide an identifier for an ePDG to connect to EPC, and/or an identifier for an N3IWF to connect to a 5GCN and may provide that information for the one or more PLMNs the WLAN has interworking agreement with. The UE may provide to the WLAN the one or more non-3GPP connectivity methods it supports, in which case the AAA may provide only the identifiers of the security gateways supporting the one or more methods. The UE then use the received FQDN of either the ePDG or the N3IWF and uses the DNS, server function to obtain the IP address(es) of the ePDG or N3IWF. The AM may also provide available security gateways per service or network slice identifier. If the UE provided to the AAA the requested service or the network slice, the AAA may return only the available security gateways (ePDG and/or N3IWF that can be used to access the requested service or the network slice for the one or more PLMN. The UE selects a security gateway based on its capability, preferences and service/network slice and based on the PLMN priority. If the UE supports both connectivity methods (non-3GPP 4G and non-3GPP 5G), the UE may select a security gateway based on the PLMN preference or based on its own preferences and based on the requested service/network slice if such information is received from the AAA>

2. UE may instead obtain the security gateway identifier from a DNS. The UE constructs an FQDN (which may be based on the country the UE is currently located or the operator id or the PLMN id.) and use it to request available security gateways from the DNS. The DNS may then return one or more records, which may be provide for each PLMN, and where each record comprise the available ePDG and N3IWF IP addresses or identifiers provided in the order of priority for the one or more PLMNs the UE is able to access. It may also provide the preferred security gateway to use for a service or network slice. If the FQDN includes the service or the network slice, the DNS may return only the available security gateways (ePDG and/or N3IWF that can be used to access the requested service or the network slice for the one or more PLMN. The UE selects a security gateway based on its capability, preferences and service/network slice and based on the PLMN priority. If the UE supports both connectivity methods (non-3GPP 4G and non-3GPP 5G), the UE may select a security gateway based on the PLMN preference or based on its own preferences and based on the requested service/network slice if such information is provided by the DNS.

3. UE may receive security gateway selection policy rules from an ANDSF server. It may also receive the rules over NAS when connected to EPC or 5GCN using 3GPP RAN access. The security gateway selection policy rules may include one or more of the following for one or more PLMNs:
    a. Supported security gateway for non-3GPP access
    b. Preferred security gateway for non 3GPP access (priority)
    c. Security gateway corresponding to a service or network slice, or Data Network Name, DNN, or Tracking area.
    d. ePDG preselection procedure enabled/disabled
    e. N3IWF preselection procedure enabled/disabled
    f. PLMN priority In one aspect, if the UE is registered via 3GPP access and determines that it wants to establish a PDU session or an additional PDU session and the UE provides a requested Network slice for the PDU session over the 3GPP access, then the Core network (5GCN or EPC) may indicate to the UE that it should connect over non-3GPP access for the requested network slice and provides either an ePDG identifier and/or an N3IWF identifier supported by the PLMN the UE is currently connected to. The UE selects one of the security gateways based on its preference to request a connection to the network slice over non-3GPP access. It will be apparent to a skilled person in the art, that the PDU session request may include the UE capability to support either or both of the non-3GPP access methods, in which case the network may determine which security gateway to provide for the UE.

In another aspect, if the UE is registered via 3GPP access on a PLMN and the UE is attempting to connect over non-3GPP access and has obtained security gateway records or information either via the AAA, ANDSF or the DNS, and the returned record for the same PLMN indicate ePDG and N3IWF as supported security gateways, then if the UE supports both methods of connecting over non-3GPP access, it could select a security gateway in the same PLMN based on its preference of the method and if available based on the supported network slices for the PLMN and security gateway. Else, the UE may select a security gateway in another PLMN if the if the PLMN does not support the In another aspect the DNS record may indicate a security gateway for service If the UE fails to connect to an ePDG in this PLMN, then the UE shall select an ePDG in one of the other PLMNs included in the DNS response.

In another embodiment, if the UE is registered via 3GPP access to a PLMN which is not included in the records obtained from DNS, AAA or ANDSF then the UE selects a security gateway in one of the PLMNs included in the response based on the following exemplary rule:

The UE first selects a PLMNs based on the prioritized list of PLMNs, verifies the security gateway record for that PLMN if it includes a security gateway that supports a connectivity method by the UE. Further if the service/network slice identifier is provided for the security gateway, the UE determines if the one or more security gateway supports the requested service/network slice. If the PLMN record indicate a security gateway that does not support the connectivity method of the UE (example the PLMN supports ePDG but the UE only supports non-3GPP 5G method), or the requested network slice is not supported, then the UE checks for another PLMN in the prioritized list.

After the UE selects a PLMN for security gateway selection, and if the record/information does not already include the IP address of the security gateway, the UE may construct an Operator Identifier FQDN for the selected PLMN which may include the network slice identifier and uses the DNS server function to obtain the IP address of the security gateway (ePDG or N3IWF) in this PLMN. If the PLMN supports both types of security gateway (ePDG and N3IWF), the UE may also specify the type of security gateway it wants to use in the FQDN.

The UE may use a combination of those criteria to enable the UE to perform security gateway selection when a PLMN/TA includes both security gateways (ePDG and N3IWF) as described in the embodiments herein. Operator deployment which can include only N3IWFs in PLMN/TA, only ePDG in PLMN/TA are only supported, however, one embodiment is provided wherein the UE would only select the corresponding N3IWF or ePDG that supports the network slice/service.

Figure 6:
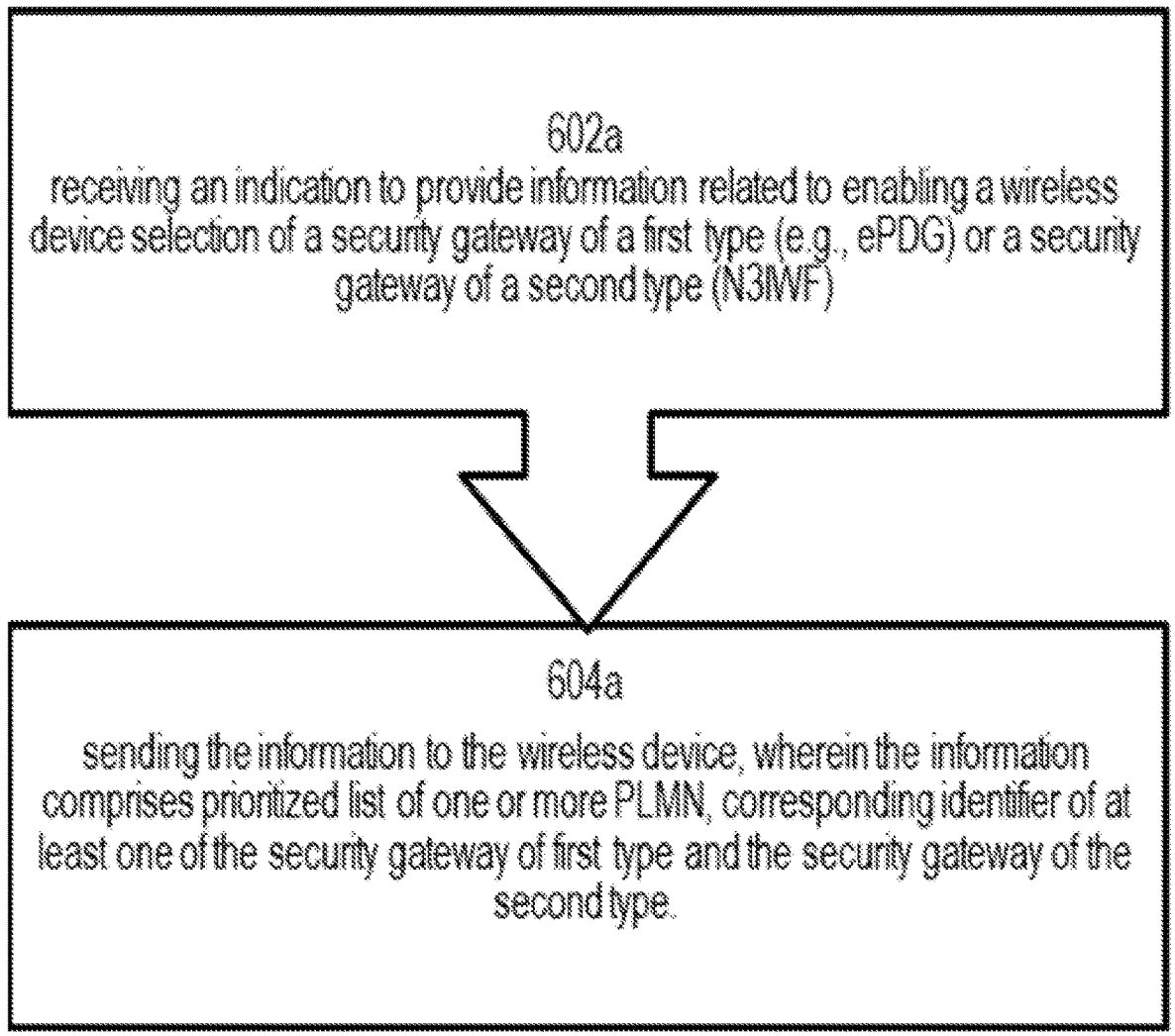
FIG. 6 illustrates a method in the network function for providing information to the wireless device for selecting the security gateway, according to an embodiment.

FIG. 6 illustrates an embodiment of a method in one of the network entity mentioned above for providing the information to the wireless device in accordance with some of the embodiments described herein. One or more of the following information can be provided to the UE:
  1. ePDG identifier configuration (if ePDG is supported in the PLMN): comprising the FQDN or IP address of an ePDG in the PLMN and a corresponding priority for selecting an ePDG or an N3IWF in that PLMN. ePDG may be provided for a network slice, service type or data network name, DNN. The PLMN may be an HPLMN or the PLMN where it is currently located or a list of all available PLMNs in the area/country. A priority for selecting the ePDG may be provided.
  2. N3IWF identifier configuration (if N3IWF is supported in PLMN): comprising the FQDN or IP address of an N3IWF in the HPLMN and a corresponding priority for selecting an ePDG or an N3IWF in that PLMN. N3IWF may be provided for a network slice, service type or DNN. The PLMN may be an HPLMN or the PLMN where it is currently located or a list of all available PLMNs in the area/country. A priority for selecting the N3IWF may be provided.
  3. Indication of whether ePDG preselection procedure enabled/disabled: in the event the UE is already attached/registered to 5GCN over 3GPP RAN node, then this indicator indicates to the UE if it should move the 3GPP RAN connection to the same network over which a non-3GPP connection will be established, i.e., EPC.
  4. N3IWF preselection procedure enabled/disabled: in the event the UE is already attached/registered to EPC over 3GPP RAN node, then this indicator indicates to the UE if it should move the 3GPP RAN connection to the same network over which a non-3GPP connection will be established, i.e., 5GCN.
  5. a prioritized list of PLMNs which are preferred for ePDG selection. It also indicates if selection of an ePDG in a PLMN should be based on Tracking/Location Area Identity FQDN or on Operator Identifier FQDN. The list of PLMNs may include the HPLMN.
  6. a prioritized list of PLMNs which are preferred for N3IWF selection. It also indicates if selection of an N3IWF in a PLMN should be based on Tracking/Location Area Identity FQDN or on Operator Identifier FQDN. The list of PLMNs may include the HPLMN.

Other information may also be provided that will enable the UE to select an appropriate. If a PLMN/TA supports an ePDG and an N3IWF, the information may provide a PLMN preference for security gateway. In one embodiment, the network provides the security gateway for a service type, network slice or DNN. In other embodiment, if the network receives from the UE a requested service type, DNN or network slice, the network may provide only the security gateway for the requested service type, DNN or the network slice.

Figure 7:
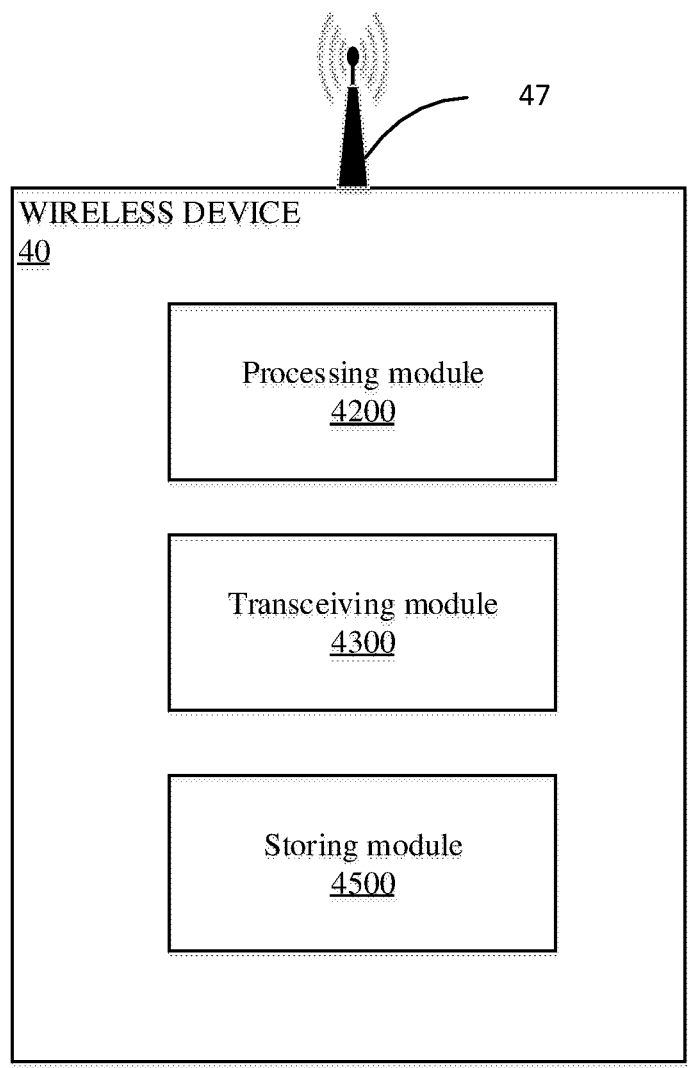
FIG. 7 illustrates a circuitry of a wireless device, according to an embodiment.

Referring to FIG. 7, the wireless device 40 (also referred to herein as a

UE) may comprise an antenna 47, a processing module 4200, a transceiving module 4300 and a storing module 4500 that may perform steps or functions described herein in relation with some embodiments.

Figure 8:
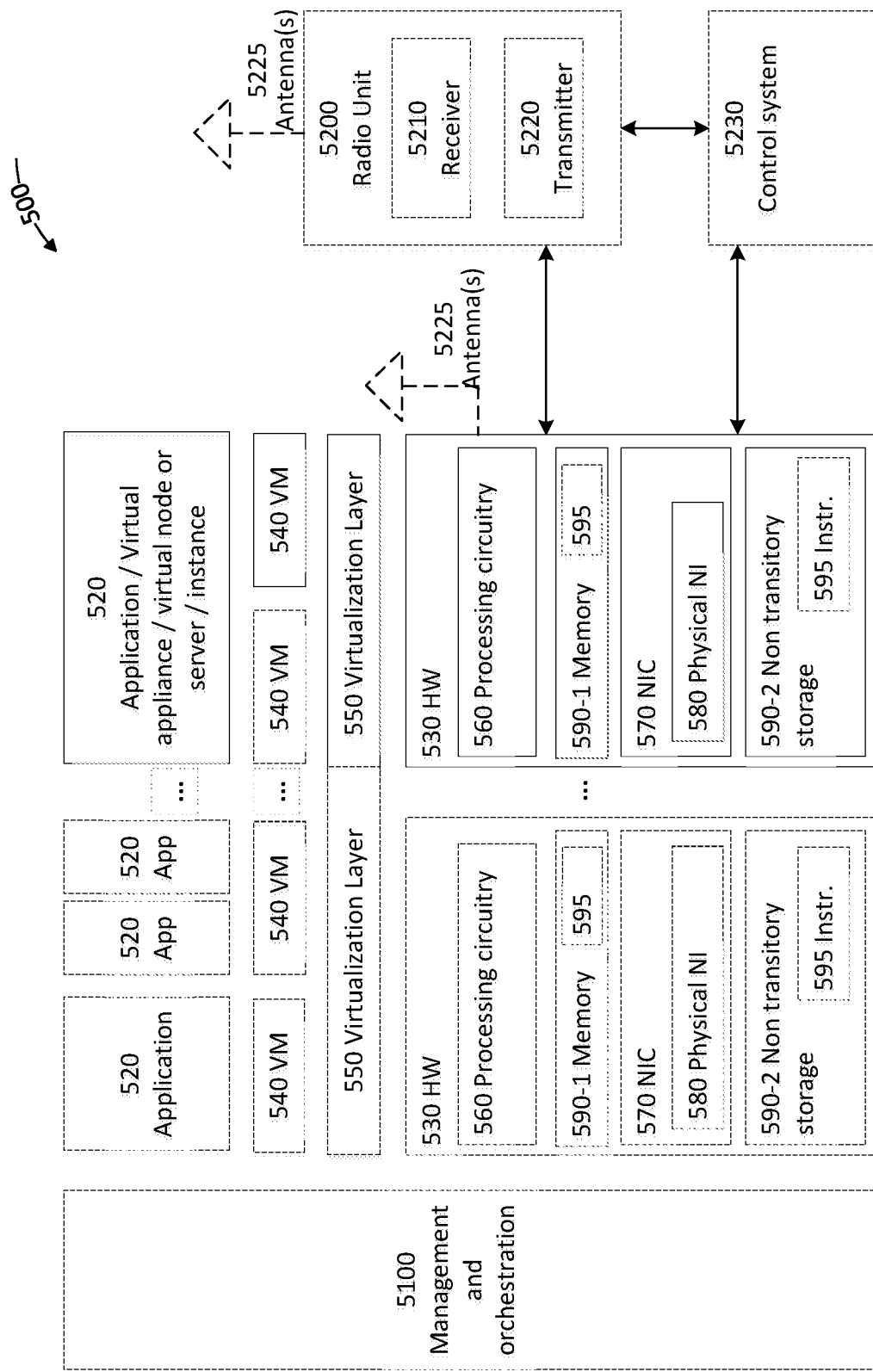
FIG. 8 is a schematic block diagram illustrating a virtualization environment in which functions implemented by some embodiments are virtualized.

FIG. 8 is a schematic block diagram illustrating a virtualization environment 500 in which functions implemented by some embodiments may be virtualized. In the present context, virtualizing means creating virtual versions of apparatus or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks) or to a network node in the Core network (5GC and/or EPC).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node or another network node, such as AAA, DNS, ANDSF or AMF), then the network node may be entirely virtualized. Those network nodes provide one or more of the embodiments described herein such as providing the information to the UE to all the UE to select an appropriate security gateway as described in the embodiments herein.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 run in virtualization environment 500 which provides hardware 530 comprising processing circuitry 560 and memory 590. Memory 590 contains instructions 595 executable by processing circuitry 560 whereby application 520 is operative to provide any of the relevant features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware devices may also include non-transitory, persistent, machine-readable storage media 590-2 having stored therein software 595 and/or instruction executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (V4). Virtualization layer 550 may present a virtual operating platform that appears like networking hardware to virtual machine 540.

As shown in FIG. 8, hardware 530 may be a standalone network node, with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine 540 is a software implementation of a physical machine that runs programs as if they were executing on a physical, non-virtualized machine. Each of virtual machines 540, and that part of the hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 8.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the respective functional unit to perform corresponding functions according one or more embodiments of the present disclosure.

Figure 9:
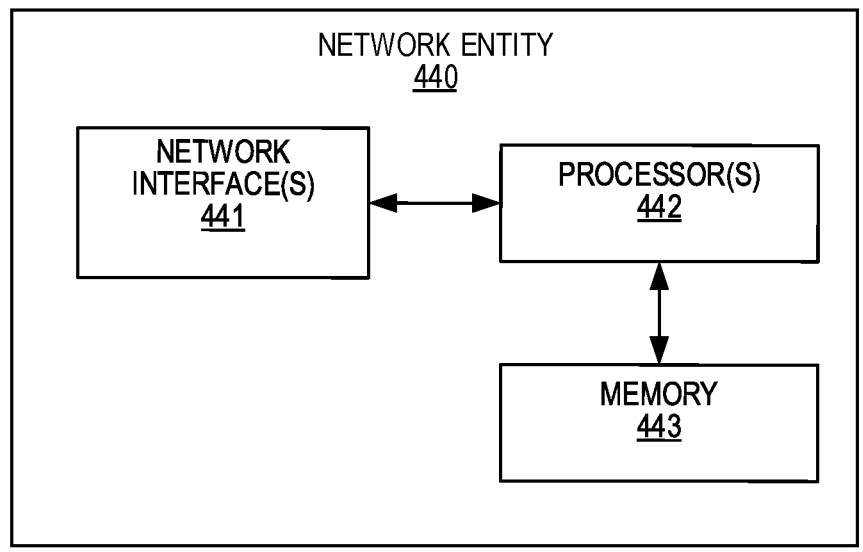
FIG. 9 illustrates a circuitry of a Network entity according to an embodiment.

In FIG. 9, Network entity 440 comprises processor 442, storage 443 and interface 441. These components are depicted as single boxes located within a single larger box. The network entity may be the MA, DNS, ANDSF or AMF that may provide the information to the UE for enabling it to select a security gateway as described in the embodiments herein. A network entity may be a network node and may comprise multiple different physical components that make up a single illustrated component (e.g., interface 441 may comprise terminals for coupling wires for a wired connection and/or a radio transceiver for a wireless connection). As another example, network entity 440 may be a virtual network node in which multiple different physically separate components interact to provide the functionality of network entity 440 (e.g., processor 442 may comprise three separate processors located in three separate enclosures, where each processor is responsible for a different function for a particular instance of network node 440). Similarly, network entity 440 may be composed of multiple physically separate components (e.g., multiple AMFs or multiple AAA servers or multiple DNS servers, etc.), which may each have their own respective processor, storage, and interface components. In some embodiments, network node 440 may be configured to support multiple interfaces. In such embodiments, some components may be duplicated (e.g., separate storage 443) and some components may be reused.

Processor 442 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network entity 440 components, such as storage 443, network entity 440 functionality. For example, processor 442 may execute instructions stored in storage 443. Such functionality may include providing various features discussed herein to a wireless device, such as WD 40, including any of the features or benefits disclosed herein.

Storage 443 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 443 may store any suitable instructions, data or information, including software and encoded logic, utilized by network entity 440. Storage 443 may be used to store any calculations made by processor 442 and/or any data received via interface 441.

Network entity 440 also comprises interface 441 which may be used in the wired or wireless communication of signalling and/or data between network entity 440, network 410, and/or WD 40. For example, interface 441 may perform any formatting, coding, or translating that may be needed to allow network entity 440 to send and receive signaling/data from network 410 over a wired connection and to and from the WD 40.

Network entity 440 may perform steps or functions described herein in relation with some embodiments.

Any appropriate steps, methods, or functions described herein may also be performed through one or more functional modules. Each module can contain sub modules as would be apparent to a person skilled in the art. For example, a transceiving module may comprise a sending module and a receiving module.

Figure 10:
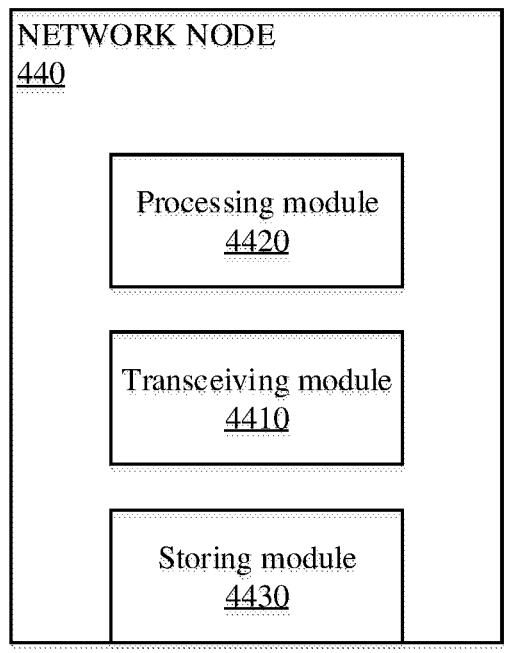
FIG. 10 illustrates a circuitry of a Network entity according to another embodiment.

Referring to FIG. 10, the network node 440 may comprise a processing module 4420, a transceiving module 4410 and a storing module 4430 that may perform steps or functions described herein in relation with some embodiments.

Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 42 and/or 442, possibly in cooperation with storage 45 and/or 443. Processors 42 and/or 442 and storage 45 and/or 443 may thus be arranged to allow processors 42 and/or 442 to fetch instructions from storage 45 and/or 443 and execute the fetched instructions to allow the respective functional module to perform any steps or functions disclosed herein.

Embodiments

While not being limited thereto, some other example embodiments of the present disclosure are provided below. Note that these are merely examples and may not necessarily be the final claims.

1. A method performed at a wireless device for selecting a security gateway for access over a non-3GPP access network, the method comprising:
   obtaining information related to selection of a security gateway of a first type or a security gateway of a second type; and
   Selecting one of the security gateway of the first type or the security gateway of the second type for establishing a connection over the non 3GPP access network in accordance with the obtained information and a status of a connection, if available, of the wireless device over a 3GPP radio access network, wherein the security gateway of the first type provides access for the wireless device to a first type of core network and the security gateway of the second type provides access for the wireless device to a second type of core network.

2. The method of embodiment 1, wherein the method further comprising determining that the wireless device is already connected in a first public Land Mobile Network, PLMN, to one of the first type of core network or the second type of core network over a 3GPP radio access network.

3. The method of embodiment 1 wherein the obtained information comprises a priority list for one or more public land mobile networks, PLMNs, that provide at least one the security gateway of first type and the security gateway of the second type.

4. The method of embodiments 1 and 2, wherein a selected PLMN that provides the security gateway is the first PLMN to which the wireless device is connected over the 3GPP radio access network.

5. The method of embodiments 1 and 2, wherein the step of selecting comprises selecting the security gateway in the first PLMN where a connection over the 3GPP radio access for the wireless device already exists.

6. The method of embodiments 1, 2 and 5, wherein the method further comprises selecting the security gateway of the first type providing access to the first type of core network while the wireless device is connected to the second type of core network over the 3GPP radio access network, wherein the first type of core network and the second type of core network are in the first PLMN.

7. The method of embodiments 1, 2 wherein the step of selecting further comprises selecting in a second PLMN the security gateway of the first type providing access to the first type of core network while the wireless device is connected to the second type of core network in the first PLMN over the 3GPP radio access network.

8. The method of embodiment 6 or 7 wherein the method further comprises moving the connection existing over the 3GPP radio access network from the second type of core network to the first type of core network.

9. The method of embodiment 1 and 8, wherein the information comprises instruction for moving the connection over the 3GPP radio access network from the second type of core network to the first type of core network.

10. The method of embodiment 1, wherein the information further comprises for one or more PLMNs, an identifier of the security gateway of the first type or the identifier of the security gateway of the second type corresponding to a network slice.

11. The method of embodiment 1, wherein the information further comprises for one or more PLMNs, an identifier of the security gateway of the first type or the identifier of the security gateway of the second type corresponding to a data network name.

12. The method of embodiment 1, wherein the information further comprises for one or more PLMNs, an identifier of the security gateway of the first type or the identifier of the security gateway of the second type corresponding to a service type.

13. The method of embodiments 1, 2, 3, and 9 to 12 wherein the information is obtained over the 3GPP Radio Access network using Non Access Stratum protocol layer.

14. The method of embodiments 1, 3, 9 to 12, wherein the information is obtained during local authentication from the non-3GPP access network.

15. The method of embodiments 14, wherein the information is obtained from an Authentication, Authorization and Accounting, AAA, server in the non-3GPP access network.

16. The method of embodiment 1, 3, 9 to 12, wherein the information is obtained via Domain name server.

17. The method of embodiment 10, wherein the method further comprises, sending a request to obtain the information for the security gateway, wherein the request comprises a requested network slice.

18. The method of embodiment 1, 10 and 17, wherein the selected security gateway is based on information comprising the requested network slice.

19. The method of embodiment 1, wherein the selected security gateway is based on at least one of capability of the wireless device to connect to the first type of core network and/or the second type of core network, a preference of the PLMN when provided and a preference of the wireless device.

20. A computer program comprising instructions which, when executed on at least one processor, cause the at least one processor to carry out the method according to any one of embodiments 1 to 19.

21. A carrier containing the computer program of embodiment 20, wherein the carrier is one of an electronic signal, an optical signal, a radio signal, or a computer readable storage medium.

22. A wireless device adapted to operate according to the method of any one of embodiments 1 to 19.

23. A wireless device comprising at least one transceiver; and circuitry operable to perform the method of any one of the embodiments 1-19.

24. A wireless device comprising one or more modules configured to operate according to the method of any one of the embodiments 1-19.

25. A method in a network entity for enabling a wireless device to select a security gateway for connecting to a core network over a non-3GPP access network, the method comprising the steps of:
receiving an indication to provide information related to enabling a wireless device selection of a security gateway of a first type or a security gateway of a second type; and
sending the information to the wireless device, wherein the information comprises prioritized list of one or more PLMN, corresponding identifier of at least one of the security gateway of first type and the security gateway of the second type.

26. The method of embodiment 25, wherein the indication comprises one of a requested network slice or a data network name.

27. The method of embodiments 25 and 26, wherein the corresponding identifier is associated to the at least one of the security gateway of first type and the security gateway of the second type supporting the requested network slice.

28. The method of embodiment 25 wherein the security gateway of first type is an ePDG and the security gateway of the second type is an N3IWF.

29. A network entity to enable a wireless device to select a security gateway for connecting to a core network over a non-3GPP access network, the network node comprising processing circuitry and memory, said memory containing instructions executable by said processing circuitry whereby said network node is operative to perform the method of any of the embodiments 25-28.

30. A network entity adapted to operate according to the method of any one of embodiments 25 to 28.

31. A network entity of embodiment 30, wherein the network entity is an Access Mobility Function that sends the information to the wireless device over Non-Access Stratum.

Below is an example describing a potential standardization of the one or more embodiments into 3GPP TS 23.502 as described herein.

Standardizing the Proposed Solutions

Following is a non-limiting example of how certain aspects of the proposed solutions could be implemented within the framework of a specific communication standard. In particular, the attached Appendix provides a non-limiting example of how the proposed solutions could be implemented within the framework of a 3GPP TSG SA2 and CT1 standard. The changes described by the Appendix are merely intended to illustrate how certain aspects of the proposed solutions could be implemented in a particular standard. However, the proposed solutions could also be implemented in other suitable manners, both in the 3GPP Specification and in other specifications or standards.

SA WG2 Meeting #124   S2-17XXXXX

November 27- December 1, 2017, Reno, Nevada (revision of S2-17xxxx)

Source: Ericsson

Title:    Combined Procedure for ePDG/N3IWF selection

Document for:    Discussion/Approval

Agenda item: 6.5.10

Work Item / Release:    5GS_Ph1/ Rel15

Abstract of the contribution: This document proposes a combined algorithm for ePDG/N3IWF selection that is largely based on the current ePDG selection algorithm in 23.402 and that considers a gradual deployment of N3IWFs.

1. INTRODUCTION

Currently there is no procedure defined to enable a UE desiring connection to a non-3GPP access, to select an N3IWF or ePDG. This pCR proposes a combined algorithm that enables a UE to perform selection based on operator deployment which can include only N3IWFs in PLMN/TA, only ePDG in PLMN/TA, or the availability of both in which case a priority will enable the UE to perform the selection.

2. DISCUSSION

It is assumed that section 4.5.4 applies in its entirety to a stand-alone N3IWF selection with all the necessary adaptations for N3IWF including FQDN applicable to an N3IWF.

The combined procedure for an N3IWF/ePDG selection shall result in the selection of the more efficient ePDG or N3IWF depending on the operator deployment, and where either one or the other is available, regardless of the core network the UE is attached to or registered in.

If both N3IWF, and ePDG are available in a PLMN/TA then a priority can further be used for the selection. The higher priority will be first tried, and if that failed the lower priority will be tried before giving up.

In support of the above, the combined N3IWF/ePDG procedure, which applies to single registration, is as follows:

If the UE is not attached to EPC or registered in 5GC, then the UE shall attempt to do an ePDG selection as per section 4.5.4 in TS 23.402. If the ePDG selection succeeds then the procedure stops. If the ePDG selection failed, then the UE performs the "N3IWF Preselection Procedure" below and the UE attempts to do an N3IWF selection as per section 4.5.4 in TS 23.402. The procedure stops.

If the UE is currently attached to EPC, and if a priority is present for the PLMN the UE is attached to indicating a high priority for EPC, then the UE shall attempt to select an ePDG as per section 4.5.4 in TS 23.402. If the ePDG selection succeeds then the procedure stops. If the ePDG selection failed, and the UE has not yet attempted to do an N3IWF selection prior to that, then the UE performs the "N3IWF Preselection Procedure" below, and the UE attempts to do an N3IWF selection as per section 4.5.4 in TS 23.402. The procedure stops.

If the UE is currently attached to EPC, and if a priority is present for the PLMN the UE is attached to indicating a lower priority for EPC, and the UE has not attempted already an N3IWF selection, then UE performs the "N3IWF Preselection Procedure" below. Otherwise UE shall attempt to select an ePDG as per section 4.5.4 in TS 23.402. The procedure stops.

If the UE is currently attached to EPC, and if no priority is present for the PLMN the UE is attached to then the UE shall attempt to select an ePDG as per section 4.5.4 in TS 23.402. If the ePDG selection succeeds then the procedure stops. If the ePDG selection fails, then the UE performs the "N3IWF Preselection Procedure" below.

If the UE is registered in 5GC, and if a priority is present for the PLMN the UE is attached to indicating a high priority for 5GC, then the UE shall attempt to select an N3IWF as per section 4.5.4 in TS 23.402. If the N3IWF selection succeeds then the procedure stops. If the N3IWF selection failed, and the UE has not yet attempted to do an ePDG selection prior to the failed N3IWF selection, then the UE performs the "ePDG Preselection Procedure" below and the UE attempts to do an ePDG selection as per section 4.5.4 in TS 23.402. The procedure stops.

If the UE is currently registered in 5GC, and if no priority is present for the PLMN the UE is attached to then the UE shall attempt to select an N3IWF as per section 4.5.4 in TS 23.402. If the N3IWF selection succeeds then the procedure stops. If the N3IWF selection failed, and the UE has not yet attempted to do an ePDG selection prior to the failed N3IWF selection, then the UE performs the "ePDG Preselection Procedure"

below and the UE attempts to do an ePDG selection as per section 4.5.4 in TS 23.402. The procedure stops.

If the UE is currently registered, and if a priority is present for the PLMN the UE is attached to indicating a lower priority for 5GC, then then the UE performs the "ePDG Preselection Procedure" below if it has not already performed ePDG selection prior to that, and the procedure restarts. Otherwise the UE shall attempt to select an N3IWF as per section 4.5.4 in TS 23.402, and the procedure stops.

N3IWF Preselection Procedure

If the current RAT the UE is camped on is connected to 5GC, then the UE detaches from EPC and registers in 5GC Otherwise, the UE detaches from EPC, and performs RAT reselection to NG-RAN with 5GC if the UE is in IDLE mode or request fallback to NG-RAN with 5GC if in CONNECTED mode (or the UE simply leaves the current RAT and reselects NG-RAN if available and if the UE is in CONNECTED mode), then registers in 5GC. The procedure than resumes back to the main selection procedure ePDG Preselection Procedure

If the current RAT the UE is camped on is connected to EPC, then the UE deregisters from 5GC, and attaches to EPC. Otherwise, the UE the UE deregisters from 5GC, and performs RAT reselection to NG-RAN with 5GC if the UE is in IDLE mode or request fallback to NG-RAN with 5GC if in CONNECTED mode (or the UE simply leaves the current RAT and reselects NG-RAN if available if and the UE is in CONNECTED mode), then attaches to EPC. The procedure than resumes back to the main selection procedure.

3. DISCUSSION

It is proposed to update 23.501 as follows:

** First Change **

6.3.6 N3IWF selection function

The UE performs N3IWF selection based on the ePDG selection mechanism specified in the TS 23.402 [xx] clause 4.5.4, operating on the N3IWF configuration parameters defined below:

- The ePDG FQDN formats (OI based and TAI based) are substituted with respective N3IWF FQDN formats as specified in TS 23.003 [xx].

Editor's note: the reference to TS 23.003 might be revised whether definition related to 5G would be included in a different TS.

- The ePDG identifier configuration and the ePDG selection information are substituted by the N3IWF identifier configuration and the N3IWF selection information respectively.

Editor's note: Whether or how Network slice information can be used for when the UE performs the N3IWF selection is FFS.

When an HPLMN supports non-3GPP access to both 5GC and EPC, as well as when the UE is roaming into a PLMN that either support non-3GPP access to both 5GC and EPC or to EPC only, the following combined selection procedure shall be used.

The procedure is based on the ePDG selection mechanism specified in the TS 23.402 [xx] enhanced to facilitate the choice between ePDG and N3IWF selection, as follows:

If the UE is not attached to EPC or registered in 5GC, then the UE shall attempt to do an ePDG selection as per section 4.5.4 in TS 23.402. If the ePDG selection succeeds then the procedure stops. If the ePDG selection failed, then the UE performs the "N3IWF Preselection Procedure" below and the UE attempts to do an N3IWF selection as per section 4.5.4 in TS 23.402. The procedure stops.

If the UE is currently attached to EPC, and if a priority is present for the PLMN the UE is attached to indicating a high priority for EPC, then the UE shall attempt to select an ePDG as per section 4.5.4 in TS 23.402. If the ePDG selection succeeds then the procedure stops. If the ePDG selection failed, and the UE has not yet attempted to do an N3IWF selection prior to that, then the UE performs the "N3IWF Preselection Procedure" below, and the UE attempts to do an N3IWF selection as per section 4.5.4 in TS 23.402. The procedure stops.

If the UE is currently attached to EPC, and if a priority is present for the PLMN the UE is attached to indicating a lower priority for EPC, and the UE has not attempted already an N3IWF selection, then UE performs the "N3IWF Preselection Procedure" below. Otherwise UE shall attempt to select an ePDG as per section 4.5.4 in TS 23.402. The procedure stops.

If the UE is currently attached to EPC, and if no priority is present for the PLMN the UE is attached to then the UE shall attempt to select an ePDG as per section 4.5.4 in TS 23.402. If the ePDG selection succeeds then the procedure stops. If the ePDG selection fails, then the UE performs the "N3IWF Preselection Procedure" below.

If the UE is registered in 5GC, and if a priority is present for the PLMN the UE is attached to indicating a high priority for 5GC, then the UE shall attempt to select an N3IWF as per section 4.5.4 in TS 23.402. If the N3IWF selection succeeds then the procedure stops. If the N3IWF selection failed, and the UE has not yet attempted to do an ePDG selection prior to the failed N3IWF selection, then the UE performs the "ePDG Preselection Procedure" below and the UE attempts to do an ePDG selection as per section 4.5.4 in TS 23.402. The procedure stops.

If the UE is currently registered in 5GC, and if no priority is present for the PLMN the UE is attached to then the UE shall attempt to select an N3IWF as per section 4.5.4 in TS 23.402. If the N3IWF selection succeeds then the procedure stops. If the N3IWF selection failed, and the UE has not yet attempted to do an ePDG selection prior to the failed N3IWF selection, then the UE performs the "ePDG Preselection Procedure" below and the UE attempts to do an ePDG selection as per section 4.5.4 in TS 23.402. The procedure stops.

If the UE is currently registered, and if a priority is present for the PLMN the UE is attached to indicating a lower priority for 5GC, then then the UE performs the "ePDG Preselection Procedure" below if it has not already performed ePDG selection prior to that, and the procedure restarts. Otherwise the UE shall attempt to select an N3IWF as per section 4.5.4 in TS 23.402, and the procedure stops.

N3IWF Preselection Procedure

If the current RAT the UE is camped on is connected to 5GC, then the UE detaches from EPC and registers in 5GC Otherwise, the UE detaches from EPC, and performs RAT reselection to NG-RAN with 5GC if the UE is in IDLE mode or request fallback to NG-RAN with 5GC if in CONNECTED mode (or the UE simply leaves the current RAT and reselects NG-RAN if available and if the UE is in CONNECTED mode), then registers in 5GC. The procedure than resumes back to the main selection procedure ePDG Preselection Procedure

If the current RAT the UE is camped on is connected to EPC, then the UE deregisters from 5GC, and attaches to EPC. Otherwise, the UE the UE deregisters from 5GC, and performs RAT reselection to NG-RAN with 5GC if the UE is in IDLE mode or request fallback to NG-RAN with 5GC if in CONNECTED mode (or the UE simply leaves the current RAT and reselects NG-RAN if available if and the UE is in CONNECTED mode), then attaches to EPC. The procedure than resumes back to the main selection procedure.

**\*\*\*\* End Change \*\*\*\***

REFERENCES

[1] 3GPP TS 23.402 V. 15.1.0 Technical Specification Group Services and System Aspects; Architecture enhancements for non-3GPP accesses (Release 15)

ABBREVIATIONS

3GPP Third Generation Partnership Project
5G Fifth Generation
5GCN 5G Core Network
4G Fourth Generation
AMF Access and Mobility Function
CPU Central Processing Unit
CN Core Network
CP Control plane
DN Data Network
DNN Data Network Name
EAP Extended Authentication Protocol
ePDG Evolved PDG
LTE Long Term Evolution
eNB Enhanced or Evolved Node B
ESP Encapsulating Security Payload
EUTRAN Evolved Universal Terrestrial Radio Access Network
FPGA Field Programmable Gate Array
gNB next generation NodeB
IKEv2 Internet Key Exchange Protocol version 2
IoT Internet of Things
IPSec Internet Protocol Security
MME Mobility Management Entity
N3IWF Non-3GPP Interworking Function
N3PP Non-3GPP Access
NF Network Function
NG Next Generation
NgPDG Next Generation Packet Data gateway
NR New Radio
5GCN Next Generation Core network
PDG Packet Data Gateway
PDU Packet Data User plane/Unit
RAN Radio Access Network
RAT Radio Access Technology
SA Security Association
SPI Security Parameter Index
UE User Equipment
UP User Plane
USB Universal Serial Bus
WiFi Wireless Fidelity
WLAN Wireless Local Area Network

The invention claimed is:

1. A method performed at a wireless device for selecting a security gateway for access over a non-third Generation Partnership Project, Non-3GPP, access network, the method comprising:
    obtaining information comprising security gateway of a first type information and security gateway of a second type information for enabling the wireless device to select the security gateway of a first type or the security gateway of a second type in a public land mobile network (PLMN), the information further comprising a service type and a PLMN preference for the security gateway of the first type or of the second type;
    selecting, based on a requested service type and the PLMN preference, one of the security gateway of the first type or the security gateway of the second type that supports the requested service type for establishing a connection over the non-3GPP access network, wherein the security gateway of the first type provides access for the wireless device to a first type of 3GPP core network and the security gateway of the second type provides access for the wireless device to a second type of 3GPP core network; and
    establishing a connection to the selected security gateway.

2. The method of claim 1 further comprising selecting one of the security gateway of the first type or the security gateway of the second type based on determining that a connection over a 3GPP radio access network to the first type of 3GPP core network or the second type of 3GPP core network exists.

3. The method of claim 1 wherein the obtained information comprises a priority list for one or more public land mobile networks, PLMNs, that provide at least one the security gateway of the first type and the security gateway of the second type.

4. The method of claim 1, wherein the method further comprises selecting a first PLMN that is the same PLMN selected for access over the 3GPP radio access network.

5. The method of claim 1, wherein the method further comprises selecting the security gateway of the first type for access to the first type of 3GPP core network while the wireless device is connected to the second type of 3GPP core network over the 3GPP radio access network, wherein the first type of 3GPP core network and the second type of 3GPP core network are in the first PLMN.

6. The method of claim 1 wherein the step of selecting further comprises selecting in a second PLMN the security gateway of the first type for access to the first type of 3GPP core network while connected to the second type of 3GPP core network in a first PLMN over the 3GPP radio access network.

7. The method of claim 6 wherein the method further comprises moving existing connection over the 3GPP radio access network from the second type of 3GPP core network to the first type of 3GPP core network.

8. The method of claim 1, wherein the information comprises instruction for moving the existing connection over the 3GPP radio access network from the second type of 3GPP core network to the first type of 3GPP core network.

9. The method of claim 1, wherein the information further comprises for one or more PLMNs, an identifier of the security gateway of the first type or the identifier of the security gateway of the second type associated to a network slice.

10. The method of claim 1, wherein the information further comprises for one or more PLMNs, an identifier of the security gateway of the first type or the identifier of the security gateway of the second type associated to a data network name, DNN.

11. The method of claim 1, wherein the information further comprises for one or more PLMNs, an identifier of the security gateway of the first type or the identifier of the security gateway of the second type corresponding to the service type.

12. The method of claim 1, wherein the information is obtained over the 3GPP radio access network using Non-Access Stratum, NAS, protocol layer.

13. The method of claim 1, wherein the information is obtained during local authentication in the non-3GPP access network.

14. The method of claim 13, wherein the information is obtained from an Authentication, Authorization and Accounting, AAA, server in the non-3GPP access network.

15. The method of claim 1, wherein the information is obtained via Domain Name Server, DNS.

16. The method of claim 1, wherein the selected security gateway is based on at least one of capability of the wireless device to connect to the first type of 3GPP core network and the second type of 3GPP core network, and a preference of the wireless device.

17. The method of claim 1 wherein when the step of selecting, based on a requested service type and the PLMN preference, one of the security gateway of the first type or the security gateway of the second type that supports the requested service type for establishing a connection over the non-3GPP access network, fails, selecting the other one of the security gateway of the first type or the security gateway of the second type.

18. A method in a network entity for enabling a wireless device to select a security gateway for connecting to a core network over a Non-third Generation Partnership Project, Non-3GPP access network, the method comprising the steps of:

obtaining an indication to provide information comprising security gateway of a first type information and security gateway of a second type information for enabling a wireless device to select a security gateway of a first type or a security gateway of a second type for a service type in a public land mobile network (PLMN); and transmitting the information to the wireless device, wherein the information comprises a prioritized list of one or more PLMN, a PLMN preference for the security gateway of a first type or the security gateway of a second type and information for identifying the security gateway of the first type and the security gateway of the second type supporting the service type; and wherein the security gateway of the first type provides access for the wireless device to a first type of 3GPP core network and the security gateway of the second type provides access for the wireless device to a second type of 3GPP core network.

19. The method of claim 18, wherein the indication comprises one of a requested network slice or a data network name.

20. The method of claim 18 wherein the security gateway of the first type is an evolved Packet Data Gateway, ePDG, and the security gateway of the second type is a Non-3GPP Interworking Function, N3IWF.

* * * * *